US012531746B2

(12) United States Patent
Filipek et al.

(10) Patent No.: US 12,531,746 B2
(45) Date of Patent: Jan. 20, 2026

(54) ENABLING CONSENSUS IN DISTRIBUTED TRANSACTION PROCESSING SYSTEMS

(71) Applicant: International Business Machines Corporation, Armonk, NY (US)

(72) Inventors: Bartlomiej Stanislaw Filipek, Filipowice (PL); Michal Zarakowski, Cracow (PL); Wojciech Mis, Cracow (PL); Maciej Snopczynski, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 785 days.

(21) Appl. No.: 16/826,484

(22) Filed: Mar. 23, 2020

(65) Prior Publication Data

US 2021/0297264 A1    Sep. 23, 2021

(51) Int. Cl.
*H04L 9/00*  (2022.01)
*H04L 9/06*  (2006.01)
*H04L 9/32*  (2006.01)

(52) U.S. Cl.
CPC .......... H04L 9/3247 (2013.01); H04L 9/0637 (2013.01); H04L 9/3236 (2013.01); *H04L 9/50* (2022.05)

(58) Field of Classification Search
CPC ... H04L 9/3247; H04L 9/0637; H04L 9/3236; H04L 2209/38; H04L 9/3297; H04L 9/3239
See application file for complete search history.

(56) References Cited

U.S. PATENT DOCUMENTS

| | | | |
|---|---|---|---|
| 11,115,912 B1* | 9/2021 | Paczkowski | G06F 16/1824 |
| 2011/0185010 A1* | 7/2011 | Shatsky | H04L 69/28 |
| | | | 709/203 |

(Continued)

FOREIGN PATENT DOCUMENTS

| | | | |
|---|---|---|---|
| CN | 110400142 A | | 11/2019 |
| CN | 111600871 A | * | 8/2020 |

(Continued)

OTHER PUBLICATIONS

Chen et al., "An AI Based Super Nodes Selection Algorithm in BlockChain Networks," Published Aug. 1, 2018, 13 pages, https://arxiv.org/ftp/arxiv/papers/1808/1808.00216.pdf.

(Continued)

*Primary Examiner* — Kevin Ayala
(74) *Attorney, Agent, or Firm* — Yee & Associates, P.C.

(57) ABSTRACT

A distributed transaction processing system, comprising a peer node associated with a blockchain network. The peer node may be adapted to record join-time parameters for a plurality of blockchain nodes, compare a first join-time parameter for a first node of the plurality of blockchain nodes to a remainder of the join-time parameters for a remainder of the plurality of blockchain nodes, calculate, based on the comparison, a transaction signature probability (TSP) for one or more nodes within the plurality of blockchain nodes, select according to the calculated TSPs, a signature node from among the one or more nodes having calculated TSPs to sign a transaction block, and calculate, by the selected signature node, a digital signature for the transaction block.

20 Claims, 18 Drawing Sheets

(56) References Cited

U.S. PATENT DOCUMENTS

| | | | | |
|---|---|---|---|---|
| 2019/0327084 A1* | 10/2019 | Oh | ............... | H04L 9/0825 |
| 2019/0394023 A1* | 12/2019 | Menon | ............... | H04L 9/3242 |
| 2020/0133943 A1* | 4/2020 | Yim | ............... | G06F 16/2379 |
| 2021/0027182 A1* | 1/2021 | Harris | ............... | G06N 20/00 |
| 2021/0157790 A1* | 5/2021 | Zamani | ............... | G06F 16/2255 |
| 2021/0176041 A1* | 6/2021 | Subra Girish | ............... | H04L 9/3247 |

FOREIGN PATENT DOCUMENTS

| | | |
|---|---|---|
| EP | 3468095 A1 | 10/2017 |
| JP | 2002209169 A | 7/2002 |
| JP | 2019505150 A | 2/2019 |
| KR | 2019-0105320 A | 9/2019 |
| KR | 102039570 B1 | 11/2019 |

OTHER PUBLICATIONS

Saini, "ConsensusPedia: An Encyclopedia of 30+ Consensus Algorithms," A complete list/comparison of all consensus algorithms, Jun. 26, 2018, 35 pages https://hackernoon.com/consensuspedia-an-encyclopedia-of-29-consensus-algorithms-e9c4b4b7d08f.

Shrinivasan et al., "Privacy-Preserving Document Sharing, " U.S. Appl. No. 16/747,520, filed Jan. 20, 2020.

\* cited by examiner

ENABLING CONSENSUS IN DISTRIBUTED
TRANSACTION PROCESSING SYSTEMS

BACKGROUND

The present disclosure relates to finalizing and committing transactions, and more specifically, to enabling consensus in decentralized, distributed transaction processing systems.

The development of the EDVAC computer system of 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push the performance of the computer higher and higher, even more advanced computer software has evolved to take advantage of the higher performance of the hardware, resulting in computer systems today that are much more powerful than just a few years ago.

One area where computing systems have been successfully applied is transaction processing. Historically, a centralized database stores and maintains transaction data in special-purpose database programs executing at one physical and logical location. This location is often a central computer, for example, a server computer or a mainframe computer. Centralized databases are relatively easy to maintain and manage, especially for purposes of security, because of their single point of control.

SUMMARY

According to embodiments of the present disclosure, a computer-implemented method for selecting a blockchain node to sign a transaction block. One method may comprise recording join-time parameters for a plurality of blockchain nodes; comparing, by a computer processor, a first join-time parameter for a first node of the plurality of blockchain nodes to a remainder of the join-time parameters for a remainder of the plurality of blockchain nodes; calculating, by the computer processor based on the comparison, a transaction signature probability (TSP) for one or more nodes within the plurality of blockchain nodes; selecting, by the computer processor according to the calculated TSPs, a signature node from among the one or more nodes having calculated TSPs to sign a transaction block; and calculating, by the selected signature node, a digital signature for the transaction block.

According to embodiments of the present disclosure, a distributed transaction processing system, comprising a peer node associated with a blockchain network. The peer node may be adapted to record join-time parameters for a plurality of blockchain nodes, compare a first join-time parameter for a first node of the plurality of blockchain nodes to a remainder of the join-time parameters for a remainder of the plurality of blockchain nodes, calculate, based on the comparison, a transaction signature probability (TSP) for one or more nodes within the plurality of blockchain nodes, select according to the calculated TSPs, a signature node from among the one or more nodes having calculated TSPs to sign a transaction block, and calculate, by the selected signature node, a digital signature for the transaction block.

According to embodiments of the present disclosure, a computer program product comprising a non-transitory computer readable storage medium having a plurality of instructions stored thereon, which, when executed by a processor, cause the processor to perform operations. The operations may comprise recording join-time parameters for a plurality of blockchain nodes, comparing a first join-time parameter for a first node of the plurality of blockchain nodes to a remainder of the join-time parameters for a remainder of the plurality of blockchain nodes, calculating, based on the comparison, a transaction signature probability (TSP) for one or more nodes within the plurality of blockchain nodes, selecting, according to the calculated TSPs, a signature node from among the one or more nodes having calculated TSPs to sign a transaction block, and calculating, by the selected signature node, a digital signature for the transaction block.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
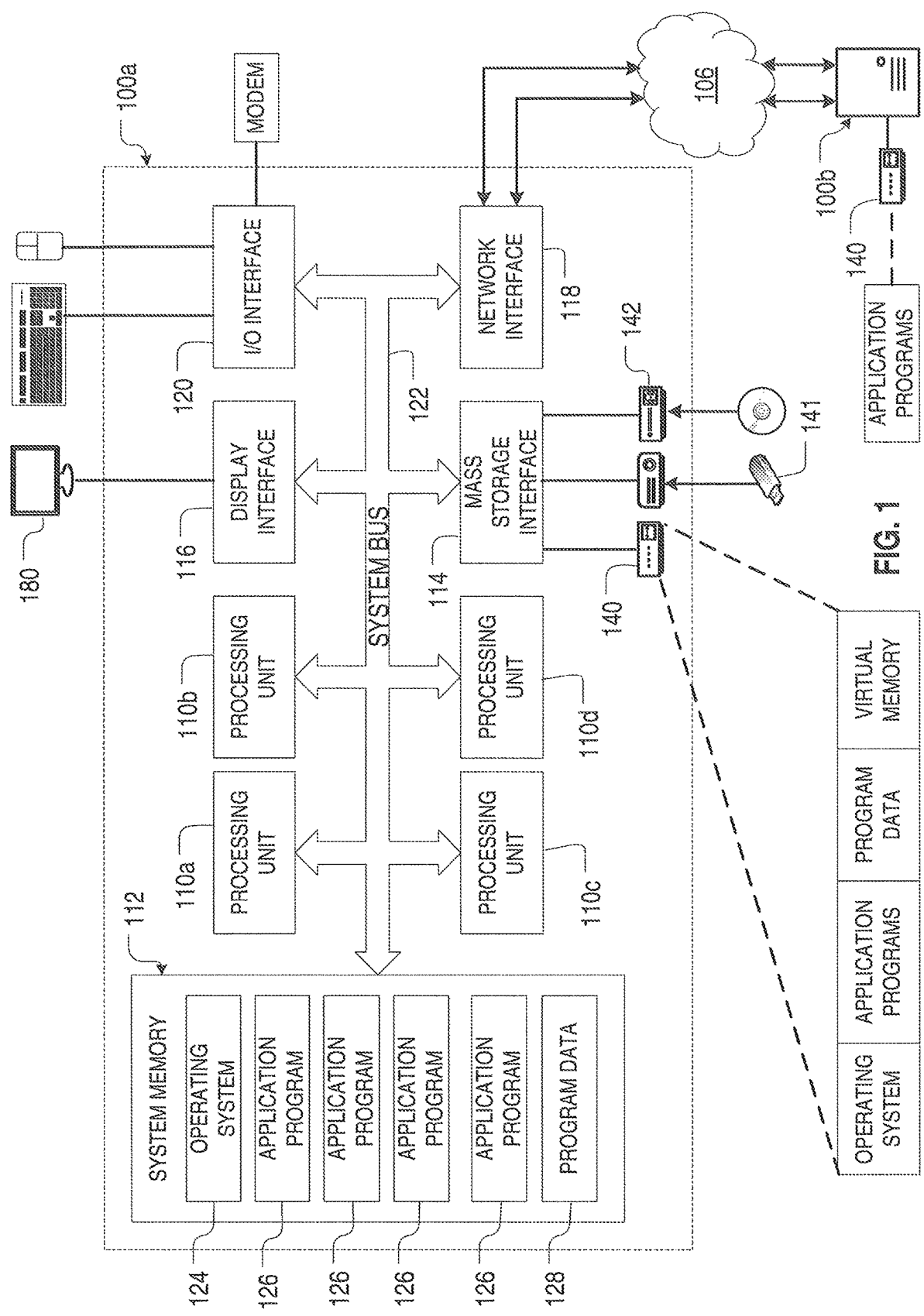
FIG. 1 illustrates a data processing system (DPS) suitable for use as a node in a blockchain network, consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to finalizing and committing transactions; more particular aspects relate to enabling consensus in decentralized, distributed transaction processing systems. While the present disclosure is not necessarily limited to such applications, various aspects of the disclosure may be appreciated through a discussion of various examples using this context.

A decentralized database generally refers to a distributed storage system in which multiple nodes cooperate to store and/or provide access to the data. A blockchain is an example of a decentralized database, which generally includes an append-only immutable data structure resembling a distributed ledger capable of maintaining records between mutually untrusted parties. These mutually untrusted parties are referred to herein as peers or peer nodes.

In some blockchain embodiments, each peer maintains a copy of the distributed database records and no single peer can modify the distributed database records without a consensus being reached among the peers. In some blockchain embodiments, the peers may execute a consensus protocol to validate blockchain transactions, to group the blockchain transactions into blocks, and to build a hash chain over the blocks. This process may form a distributed ledger by ordering the storage transactions for consistency.

In public, or permission-less, blockchain embodiments, anyone can participate without specific authorization. Permissioned blockchain embodiments, in contrast, provide a system that can secure inter-actions among a group of authorized entities that share a common goal, but which still do not fully trust one another, such as businesses that exchange funds, goods, information, and the like.

Some blockchain embodiments may operate arbitrary, programmable logic, tailored to a decentralized storage scheme, such as "smart contracts" and "chaincodes." In some of these embodiments, specialized chaincodes may exist for management functions and parameters, which are referred to as system chaincodes. Smart contracts are trusted distributed applications that leverage the tamper-proof properties of the blockchain and an underlying agreement between nodes (often referred to as an endorsement or endorsement policy).

Blockchain transactions in some embodiments may be "endorsed" before being committed to the blockchain, while transactions that are not "endorsed" may be disregarded. An endorsement policy consistent with some embodiments allows chaincode to specify endorsers for a transaction in the form of a set of peer nodes that are necessary for endorsement. When a client sends the transaction to the peers specified in the endorsement policy, the transaction may be executed to validate the transaction. After validation, the transactions may enter an ordering phase in which a consensus protocol is used to produce an ordered sequence of endorsed transactions grouped into blocks.

In some blockchain embodiments, nodes may act as the communication entities of the blockchain system. A "node" in these embodiments may perform a logical function in the sense that multiple nodes of different types can run on the same physical server. Nodes may be grouped in trust domains and may be associated with logical entities that control them in various ways. Nodes may also include different types, such as a client or submitting-client node, which submits a transaction-invocation to an endorser (e.g., peer), and ordering nodes, which broadcasts transaction-proposals to an ordering service. Yet another type of node is a peer node which can receive client submitted transactions, commit the transactions, and maintain a state and a copy of the ledger of blockchain transactions. Peer nodes in some embodiments may also have the role of an endorser, although it is not a requirement.

The ordering-service-node or orderer in some embodiments may run the communication service for all nodes, and implement a delivery guarantee, such as a broadcast to each of the peer nodes in the system when committing transactions and modifying a world state of the blockchain. In some embodiments, this world state may include the initial blockchain transaction, which normally comprises control and setup information.

In some embodiments, the distributed ledger may be a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction, in turn, may result in a set of asset key-value pairs being committed to the distributed ledger as one or more operands, such as creates, updates, deletes, and the like. The distributed ledger may include a blockchain (also referred to as a chain), which is used to store the immutable, sequenced record in blocks. The distributed ledger may also include a state database, which maintains a current state of the blockchain. Some embodiments use one distributed ledger per channel, but other embodiments are possible. Each peer node in these embodiments maintains a copy of the distributed ledger for each channel of which they are a member.

The chain in some embodiments may comprise a transaction log, which may be structured as hash-linked blocks, and each block contains a sequence of N transactions where N is equal to or greater than one. The block header may include a hash of the block's transactions, as well as a hash of the prior block's header. In this way, all transactions on the ledger may be sequenced and cryptographically linked together. Accordingly, it is not reasonably possible to tamper with the ledger data without breaking the hash links in these embodiments. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger in some embodiments may represent the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database, in some embodiments, may be simply an indexed view into the chain's transaction log, it can therefore be regenerated from the chain at any time. The state database may automatically be recovered (or generated if needed) upon peer node startup, and before transactions are accepted.

Data Processing System

FIG. 1 illustrates a data processing system (DPS) 100 suitable for use as a node in a blockchain network, consistent with some embodiments. In some embodiments, the DPS 100 is implemented as a personal computer; server computer; portable computer, such as a laptop or notebook computer, PDA (Personal Digital Assistant), tablet computer, or smart phone; processors embedded into a larger devices, such as an automobile, airplane, teleconferencing system, appliance; smart devices; or any other appropriate type of electronic device. Moreover, components other than or in addition to those shown in FIG. 1 may be present, and that the number, type, and configuration of such components may vary. Moreover, FIG. 1 only depicts the representative major components of the DPS 100, and individual components may have greater complexity than represented in FIG. 3.

The data processing system 100 in FIG. 1 comprises a plurality of central processing units 110a-110d (herein generically referred to as a processor 110 or a CPU 110) connected to a memory 112, a mass storage interface 114, a terminal/display interface 116, a network interface 118, and an input/output ("I/O") interface 120 by a system bus 122. The mass storage interface 114 in this embodiment connect the system bus 122 to one or more mass storage devices, such as a direct access storage device 140 or a readable/writable optical disk drive 142. The network interfaces 118 allow the DPS 100 to communicate with other DPS 100 over the communications medium 106. The memory 112 also contains an operating system 124, a plurality of application programs 126, and program data 128.

The data processing system 100 embodiment in FIG. 1 is a general-purpose computing device. Accordingly, the processors 110 may be any device capable of executing program instructions stored in the memory 112 and may themselves be constructed from one or more microprocessors and/or integrated circuits. In this embodiment, the DPS 100 contains multiple processors and/or processing cores, as is typical of larger, more capable computer systems; however, in other embodiments the computing systems 100 may comprise a single processor system and/or a single processor designed to emulate a multiprocessor system. Further, the processors 110 may be implemented using a number of heterogeneous data processing systems 100 in which a main processor is present with secondary processors on a single chip. As another illustrative example, the processor 110 may be a symmetric multi-processor system containing multiple processors of the same type.

When the data processing system 100 starts up, the associated processor(s) 110 initially execute the program instructions that make up the operating system 124, which manages the physical and logical resources of the DPS 100. These resources include the memory 112, the mass storage interface 114, the terminal/display interface 116, the network interface 118, and the system bus 122. As with the processor(s) 110, some DPS 100 embodiments may utilize multiple system interfaces 114, 116, 118, 120, and busses 122, which in turn, may each include their own separate, fully programmed microprocessors.

Instructions for the operating system, applications and/or programs (generically referred to as "program code," "computer usable program code," or "computer readable program code") may be initially located in the mass storage devices 140, 142, which are in communication with the processors 110 through the system bus 122. The program code in the different embodiments may be embodied on different physical or tangible computer readable media, such as the removable storage device 141 or the mass storage devices 140, 142. In the illustrative example in FIG. 1, the instructions are stored in a functional form of persistent storage on the direct access storage device 140. These instructions are then loaded into the memory 112 for execution by the processor 110. However, the program code may also be located in a functional form on the computer readable media 142 that is selectively removable and may be loaded onto or transferred to the DPS 100 for execution by the processor 110.

The system bus 122 may be any device that facilitates communication between and among the processors 110; the memory 112; and the interfaces 114, 116, 118, 120. Moreover, although the system bus 122 in this embodiment is a relatively simple, single bus structure that provides a direct communication path among the system bus 122, other bus structures are consistent with the present disclosure, including without limitation, point-to-point links in hierarchical, star or web configurations, multiple hierarchical buses, parallel and redundant paths, etc.

The memory 112 and the mass storage devices 140, 142 work cooperatively to store the operating system 124, the application programs 126, and the program data 128. In this embodiment, the memory 112 is a random-access semiconductor device capable of storing data and programs. Although FIG. 1 conceptually depicts that device as a single monolithic entity, the memory 112 in some embodiments may be a more complex arrangement, such as a hierarchy of caches and other memory devices. For example, the memory 112 may exist in multiple levels of caches, and these caches may be further divided by function, so that one cache holds instructions while another holds non-instruction data, which is used by the processor or processors. Memory 112 may be further distributed and associated with different processors 110 or sets of processors 110, as is known in any of various so-called non-uniform memory access (NUMA) computer architectures. Moreover, some embodiments may utilize virtual addressing mechanisms that allow the DPS 100 to behave as if it has access to a large, single storage entity instead of access to multiple, smaller storage entities such as the memory 112 and the mass storage device 140, 142.

Although the operating system 124, the application programs 126, and the program data 128 are illustrated as being contained within the memory 112, some or all of them may be physically located on different computer systems and may be accessed remotely, e.g., via the communications medium 106, in some embodiments. Thus, while the operating system 124, the application programs 126, and the program data 128 are illustrated as being contained within the memory 112, these elements are not necessarily all completely contained in the same physical device at the same time and may even reside in the virtual memory of other DPS 100.

The system interface units 114, 116, 118, 120 support communication with a variety of storage and I/O devices. The mass storage interface 114 supports the attachment of one or more mass storage devices 140, 142, which are typically rotating magnetic disk drive storage devices, a solid-state storage device (SSD) that uses integrated circuit assemblies as memory to store data persistently, typically using flash memory, or a combination of the two. However, the mass storage devices 140, 142 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 116 is used to directly connect one or more display units, such as monitor 180, to the data processing system 100. These display units 180 may be non-intelligent (i.e., dumb) terminals, such as an LED monitor, or may themselves be fully programmable workstations used to allow IT administrators and users to communicate with the DPS 100. Note, however, that while the display interface 116 is provided to support communication with one or more display units 180, the computer systems 100 does not necessarily require a display unit 180 because all needed interaction with users and other processes may occur via network interface 118.

The communications medium 106 may be any suitable network or combination of networks and may support any appropriate protocol suitable for communication of data and/or code to/from multiple DPS 100. Accordingly, the network interfaces 118 can be any device that facilitates such communication, regardless of whether the network connection is made using present day analog and/or digital techniques or via some networking mechanism of the future. Suitable communication media 106 include, but are not limited to, networks implemented using one or more of the "Infiniband" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols can be used to implement the communication medium 106. The Transmission Control Protocol/Internet Protocol ("TCP/IP") suite contains suitable network and transport protocols.

Blockchain Architecture

Figure 2A:
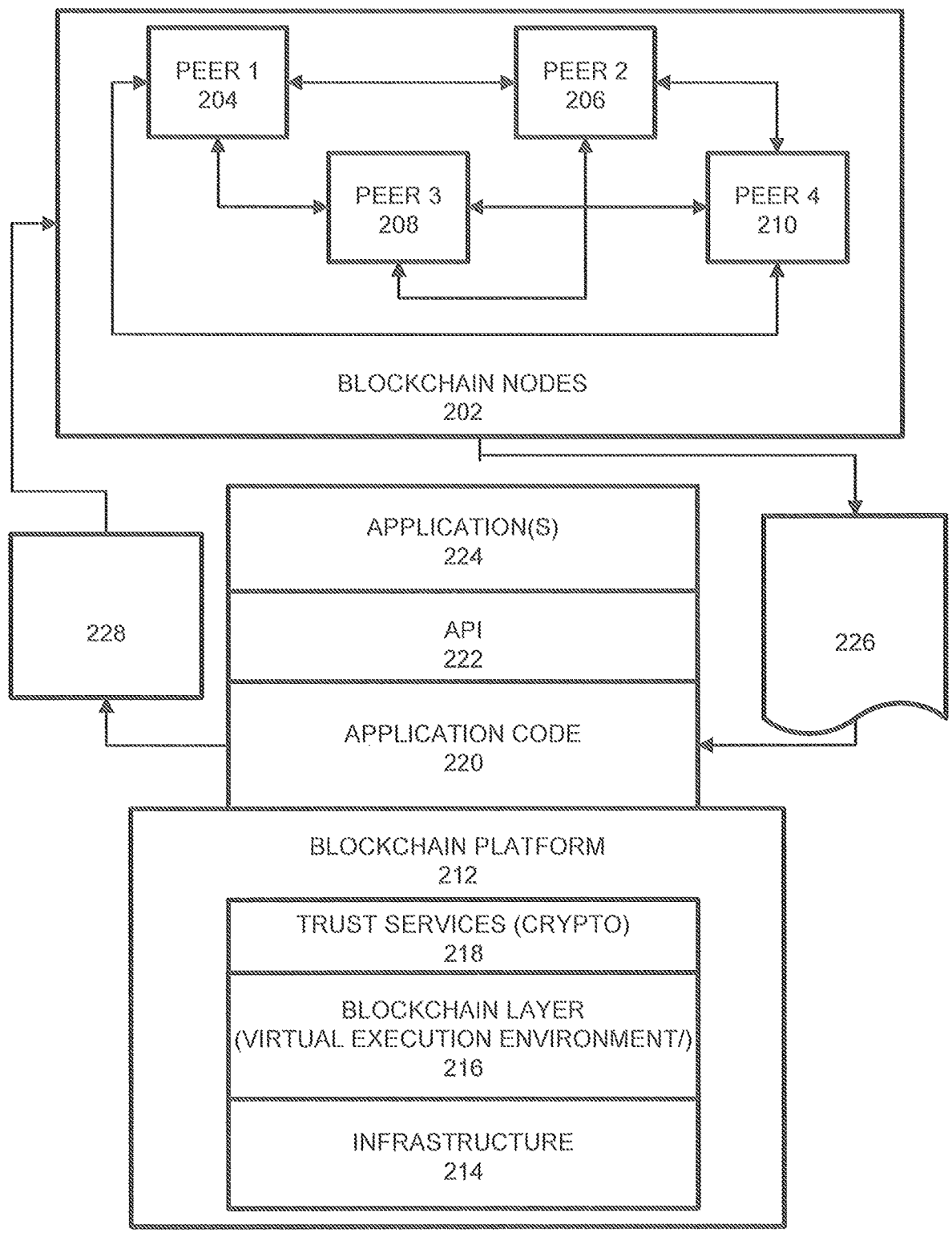
FIG. 2A illustrates an example blockchain architecture configuration, according to example embodiments.

FIG. 2A illustrates a blockchain architecture configuration 200, according to some embodiments. The blockchain architecture 200 in these embodiments may include certain blockchain elements, for example, a group of blockchain nodes 202. The group of blockchain nodes 202, in turn, may include one or more member nodes 204-210 (these four nodes are depicted by example only). These member nodes 204-210 may participate in a number of activities, such as blockchain transaction addition and validation process (consensus). One or more of the member nodes 204-210 may endorse transactions based on endorsement policy and may provide an ordering service for all blockchain nodes in the architecture 200. A member node 204-210 may initiate a blockchain authentication and seek to write to a blockchain immutable ledger stored in blockchain layer 216, a copy of which may also be stored on the underpinning physical infrastructure 214.

The blockchain architecture 200 in some embodiments may include one or more applications 224, which are linked to application programming interfaces (APIs) 222 to access and execute stored program/application code 220 (e.g., chaincode, smart contracts, etc.). The stored program/application code 220, in turn, can be created according to a customized configuration sought by participants and can maintain its own state, control their own assets, and receive external information. The stored program/application code 220 can be deployed as a transaction and installed, via appending to the distributed ledger, on all blockchain nodes 204-210.

A blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. A blockchain layer 216 may expose an interface that provides access to the virtual execution environment necessary to process the program code and engage a physical infrastructure 214. Cryptographic trust services 218 may be used to verify transactions such as asset exchange transactions and keep information private.

The blockchain architecture configuration of FIG. 2A may process and execute the program/application code 220 via one or more interfaces exposed, and services provided, by the blockchain platform 212. The program/application code 220 may control blockchain assets. For example, the code 220 can store and transfer data, and may be executed by member nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, document attribute(s) information 226 may be processed by one or more processing entities (e.g., virtual machines) included in the blockchain layer 216. A result 228 may include a plurality of linked shared documents. The physical infrastructure 214 may be utilized to retrieve any of the data or information described herein.

In some embodiments, the smart contract may be created via a high-level application and programming language, and then written to a block in the blockchain. The smart contract may include executable code that is registered, stored, and/or replicated with a blockchain (e.g., distributed network of blockchain peers). A transaction is an execution of the smart contract code that can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols in some embodiments.

The smart contract may write data to the blockchain in the format of key-value pairs. In some embodiments, the smart contract code can also read the values stored in a blockchain and use them in application operations. The smart contract code in these embodiments can then write the output of various logic operations into the blockchain. The smart contract code in some embodiments may be used to create a temporary data structure in a virtual machine or other computing platform. Data written to the blockchain in these embodiments may be public, or may be encrypted and maintained as private. The temporary data that is used/generated by the smart contract may be held in memory by the supplied execution environment, and then may be deleted once the data needed for the blockchain is identified.

The chaincode in some embodiments may comprise a code interpretation of a smart contract, with additional features. In some embodiments, the chaincode may be implemented as program code deployed on a computing network, where it is executed and validated by chain validators together during a consensus process. The chaincode may receive a hash and may retrieve from the blockchain a hash associated with the data template created by use of a previously stored feature extractor. If the hashes of the hash identifier and the hash created from the stored identifier template data match, then the chaincode may send an authorization key to the requested service. The chaincode may write to the blockchain data associated with the cryptographic details.

Figure 2B:
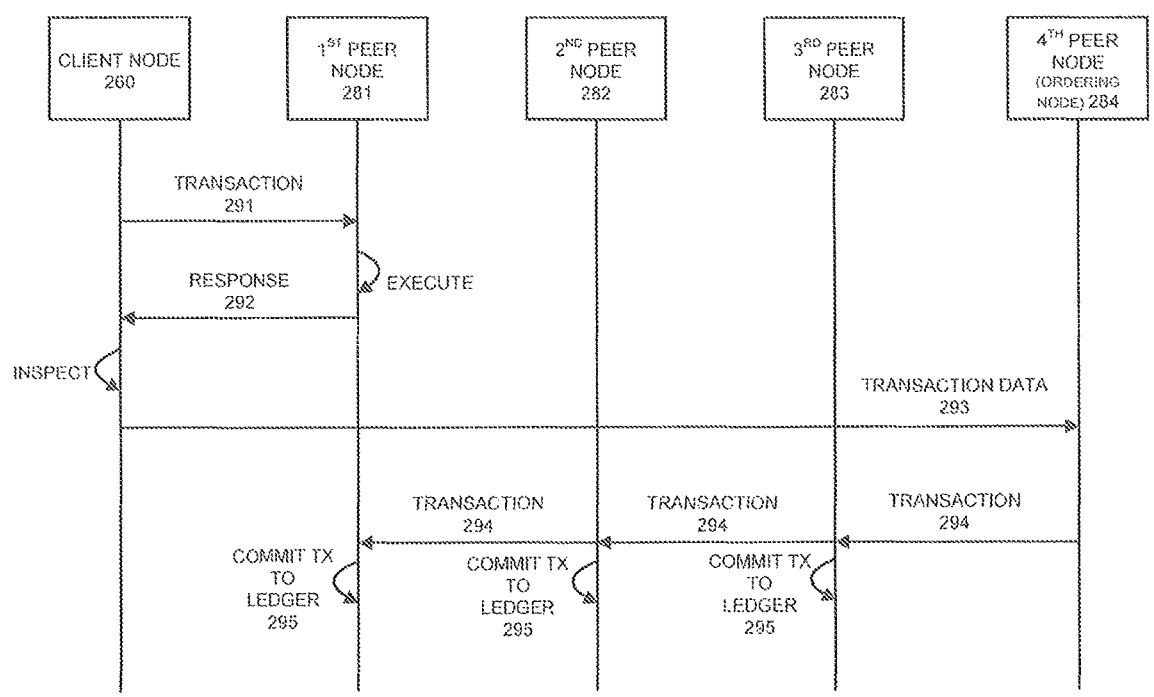
FIG. 2B illustrates a blockchain transactional flow, according to example embodiments.

FIG. 2B illustrates an example of a blockchain transactional flow 250 between nodes of the blockchain in accordance with some embodiments. The transaction flow in these embodiments may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 may then be sent back to the client node 260, along with an endorsement signature, if approved.

In response, the client node 260 may assemble the endorsements into a transaction payload 293 and broadcasts it to an ordering service node 284. The ordering service node 284 may then deliver ordered transactions as blocks to all peers 281-283 on a channel. Before committal to the blockchain, each peer 281-283 may validate the transaction. For example, the peers in some embodiments may check the endorsement policy to ensure that the correct allotment of the specified peers have signed the results and authenticated the signatures against the transaction payload 293.

With continuing reference to FIG. 2B, the client node 260 in some embodiments may initiate the transaction 291 by constructing and sending a request to the peer node 281, which may act as an endorser. The client node 260 may include an application leveraging a supported software development kit (SDK), which may utilize an available API to generate a transaction proposal. The transaction proposal, in turn, may be a request to invoke a chaincode function so that data can be read and/or written to the distributed ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify: (a) that the transaction proposal is well formed; (b) the transaction has not been submitted already in the past (replay-attack protection); (c) the signature is valid; and (d) that the submitter (client node 260, in this example embodiment) is properly authorized to perform the proposed operation on that channel. The endorsing peer node 281 may take the transaction proposal inputs as arguments to the invoked chaincode function. The chaincode may then be executed against a current state database to produce transaction results including a response value, read set, and write set. In some embodiments, no updates are made to the ledger at this point. Instead, the set of values, along with the endorsing peer node's 281 signature may be passed back as a proposal response 292 to the SDK of the client node 260, which parses the payload for the application to consume.

In response, the application of the client node 260 may inspect/verify the endorsing peers' signatures, and may compare the proposal responses to determine if the proposal response is the same. If the chaincode only queried the ledger, the application may inspect the query response and would typically not submit the transaction to the ordering node service 284. If the client application intends to submit the transaction to the ordering node service 284 to update the ledger, the application may determine if the specified endorsement policy has been fulfilled before submitting (i.e., whether all peer nodes necessary for the transaction endorse the transaction). Here, the client may include only one of multiple parties to the transaction. In this case, each client may have their own endorsing node, and each endorsing node will need to endorse the transaction. The architecture is such that even if an application elects not to inspect responses or otherwise forwards an unendorsed transaction, the endorsement policy will still be enforced by peers and upheld at the commit validation phase.

After successful inspection, in operation 293, the client node 260 may assemble endorsements into a transaction and may broadcast the transaction proposal and response within a transaction message to the ordering node 284. The transaction may contain the read/write sets, the endorsing peers' signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction may be delivered from the ordering node 284 to all peer nodes 281-283 on the channel. The transactions 294 within the block may be validated to ensure any endorsement policy is fulfilled and to ensure that there have been no changes to the ledger state for read set variables since the read set was generated by the transaction execution. Transactions in the block may be tagged as being valid or invalid. Furthermore, in operation 295, each peer node 281-283 may append the block to the channel's chain, and for each valid transaction, the write sets are committed to current state database. An event may be emitted to notify the client application that the transaction (invocation) has been immutably appended to the chain, as well as to notify whether the transaction was validated or invalidated.

Blockchain Embodiments

Figure 3A:
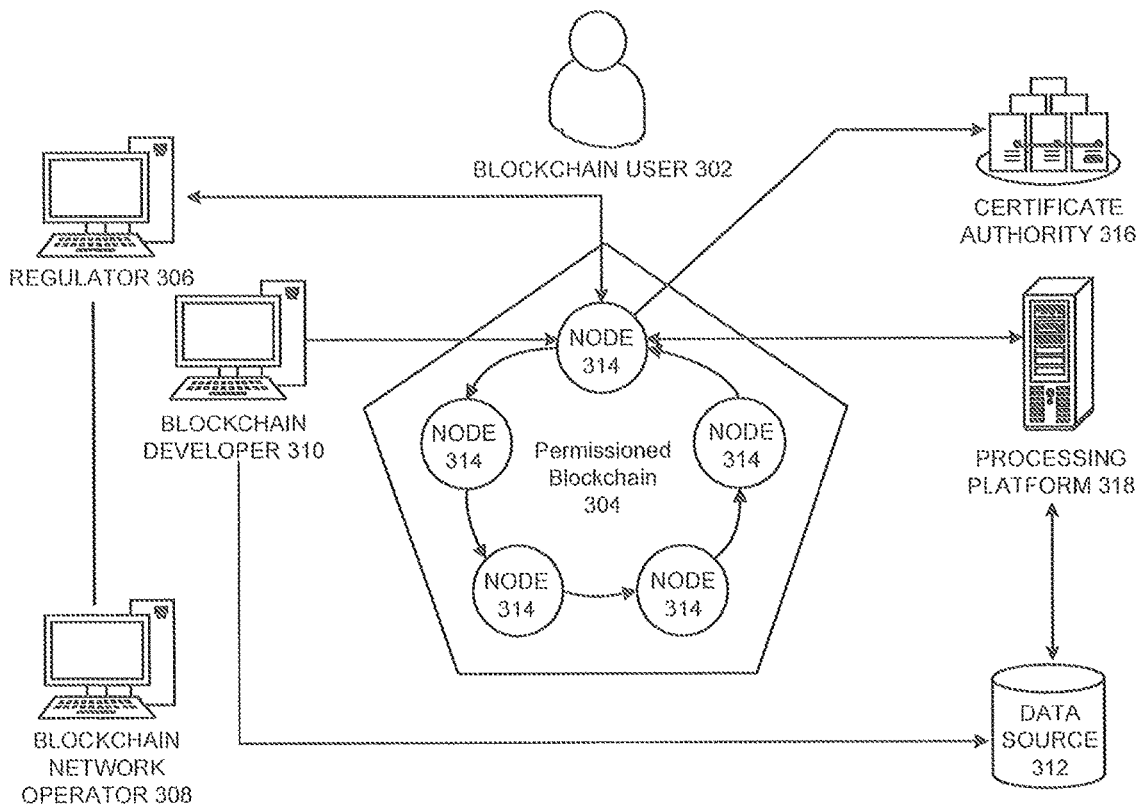
FIG. 3A illustrates a permissioned network, according to example embodiments.

FIG. 3A illustrates an example of a permissioned blockchain network 300, which features a distributed, decentralized peer-to-peer architecture, consistent with some embodiments. In this example, a blockchain user 302 may initiate a transaction to the permissioned blockchain 304. In this example, the transaction may be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor may be restricted only to querying the ledger whereas a client may be authorized to deploy, invoke, and query certain types of chaincode.

A blockchain developer 310 can write chaincode and client-side applications in some embodiments. The blockchain developer 310 in these embodiments may deploy chaincode directly to the network through an interface. To include credentials from a traditional data source 312 in chaincode, the developer 310 may use an out-of-band connection to access the data. In this example, the blockchain user 302 may connect to the permissioned blockchain 304 through a peer node 314. Before proceeding with any transactions, the peer node 314 may retrieve the user's enrollment and transaction certificates from a certificate authority 316, which manages user roles and permissions. In some embodiments, blockchain users must possess these digital certificates in order to transact on the permissioned blockchain 304. In other embodiments, blockchain users may be authenticated using other techniques, such as via distributed chains of trust. Meanwhile, a user attempting to utilize chaincode may be required to verify their credentials on the traditional data source 312. To confirm the user's authorization, chaincode may use an out-of-band connection to this data through a traditional processing platform 318.

Figure 3B:
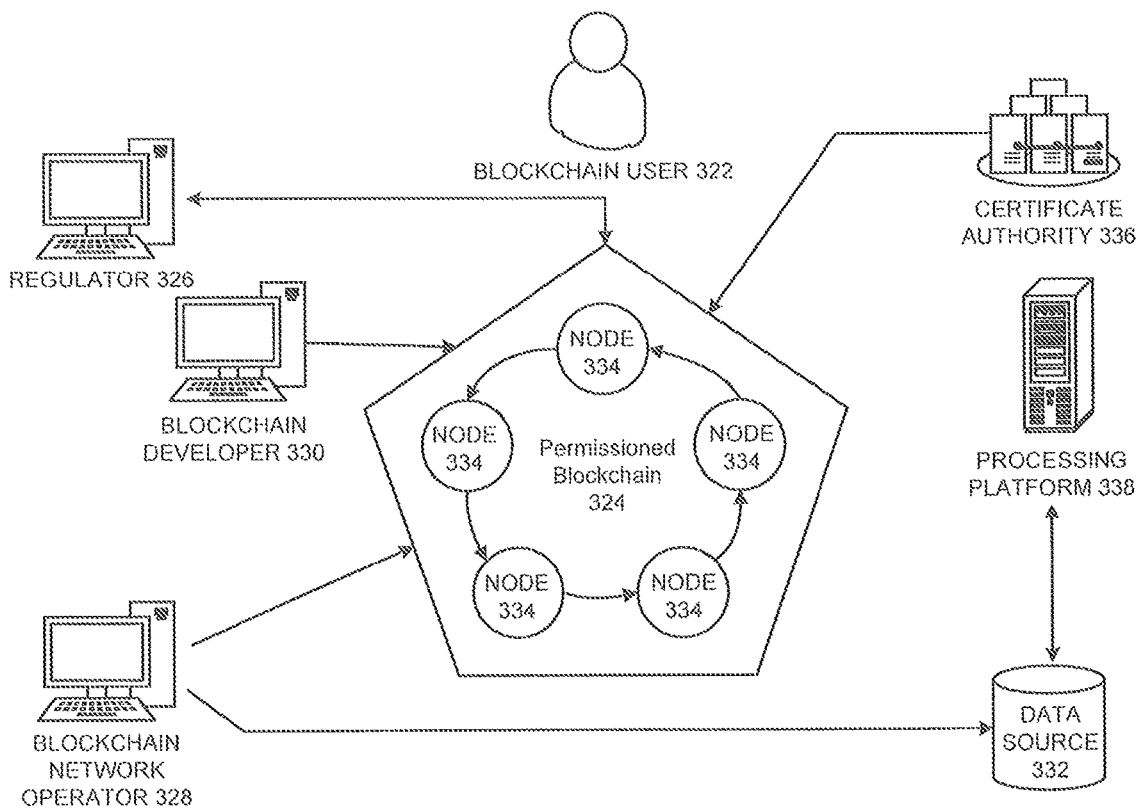
FIG. 3B illustrates another permissioned network, according to example embodiments.

FIG. 3B illustrates another example of a permissioned blockchain network 320, which features a distributed, decentralized peer-to-peer architecture, consistent with some embodiments. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client." An auditor could be restricted only to querying the ledger, whereas a client could be authorized to deploy, invoke, and query certain types of chaincode.

A blockchain developer 330 in these embodiments may write chaincode and client-side applications. The blockchain developer 330 may deploy chaincode directly to the network through an interface. To include credentials from a traditional data source 332 in chaincode, the developer 330 may use an out-of-band connection to access the data. In this example, the blockchain user 322 connects to the network through a peer node 334. Before proceeding with any transactions, the peer node 334 retrieves the user's enrollment and transaction certificates from the certificate authority 336. In some embodiments, blockchain users must possess these digital certificates in order to transact on the permissioned blockchain 324. In other embodiments, blockchain users may be authenticated using other techniques, such as via distributed chains of trust. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain may be a permissionless blockchain. In contrast with permissioned blockchains, which require authentication/authorization to join, anyone can join a permissionless blockchain. For example, to join a permissionless blockchain, a user may create a personal address and begin interacting with the network by submitting transactions, and hence adding entries to the ledger. Additionally, all parties have the choice of running a node on the system and employing the mining protocols to help verify transactions.

Figure 3C:
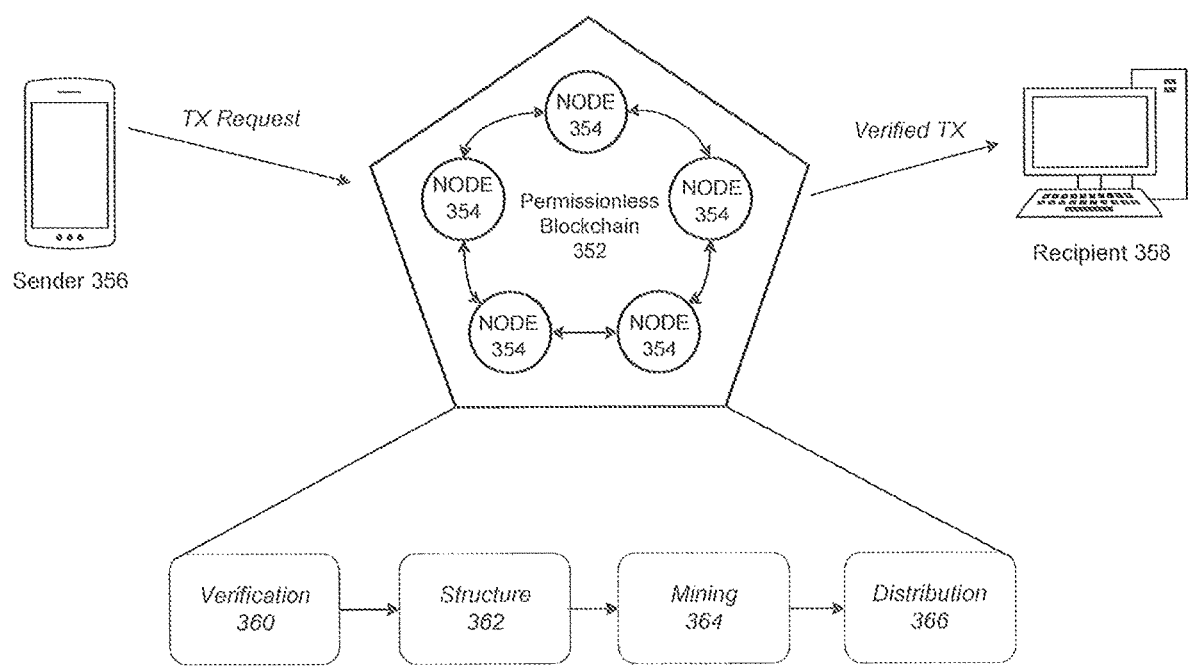
FIG. 3C illustrates a permissionless network, according to example embodiments.

FIG. 3C illustrates a process 350 of a transaction being processed by a permissionless blockchain 352 including a plurality of nodes 354, consistent with some embodiments. As an illustrative example, a sender 356 in these embodiments may desire to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters, the nodes verify 360 the transaction based on rules (which may be pre-defined or dynamically allocated) established by the permissionless blockchain 352 creators. For example, this may include verifying identities of the parties involved, etc. The transaction may be verified immediately, or it may be placed in a queue with other transactions and the nodes 354 determine if the transactions are valid based on a set of network rules.

In structure 362, valid transactions may be formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated in some embodiments. Validation for the permissionless blockchain 352 may be reached via a consensus protocol. In some types of permissionless blockchains, validators may be rewarded with value (e.g., coins, etc.) for this service.

In some embodiments, the consensus protocol, together with the chaining of blocks, makes modifications of the blockchain extremely difficult, as an attacker must modify all subsequent blocks in order for the modifications of one block to be accepted. Furthermore, as new blocks are added, the difficulty of modifying a block increases, and the number of subsequent blocks increases. With distribution 366, the successfully validated block may be distributed through the permissionless blockchain 352 and all nodes 354 may add the block to a majority chain, which is the permissionless blockchain's 352 auditable distributed ledger. Furthermore, the value in the transaction submitted by the sender 356 may be deposited or otherwise transferred to the digital wallet of the recipient device 358.

Proof-of-Age Consensus Protocol

Figure 4A:
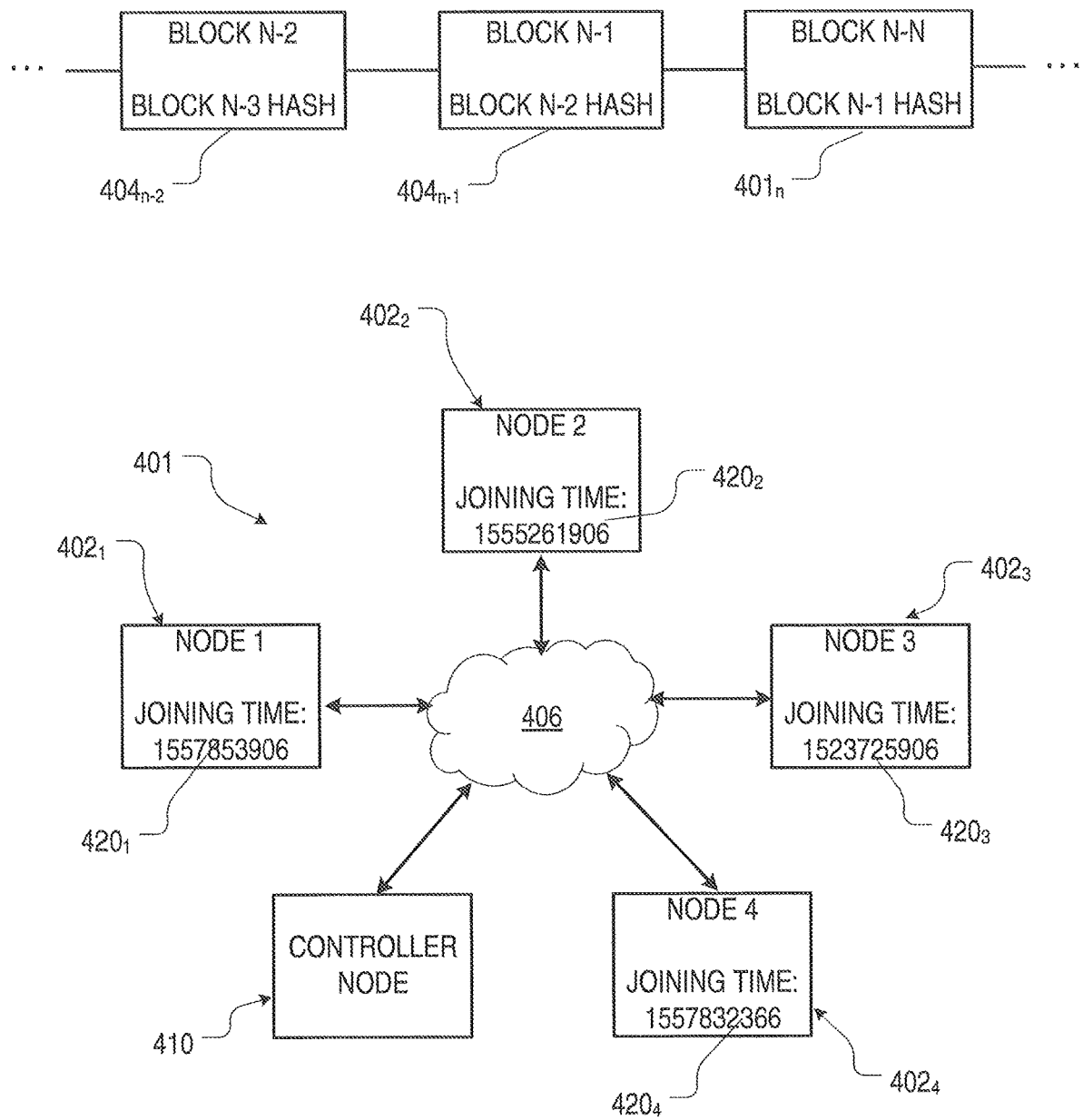
FIG. 4A illustrates a blockchain network executing a proof-of-age consensus protocol, consistent with some embodiments.

FIG. 4A illustrates a blockchain network 401 executing a proof-of-age consensus protocol, consistent with some embodiments. In this illustrative example, a plurality of peer nodes $402_1$-$402_n$ (only four shown for clarity) may communicate over a network 406 to execute the consensus protocol for validating blockchain transactions, grouping the blockchain transactions into a plurality of transaction blocks $404_{a-2}$-$404_n$, and building a hash chain 408 over a chain of transaction blocks $404_{n-2}$-$404_n$. This process, in turn, may form a distributed ledger by ordering the storage transactions for consistency.

In some embodiments, the peer nodes $402_1$-$402_n$ may comprise all of the nodes in the blockchain network 401. In other embodiments, only subset of the nodes in the blockchain network 401 may perform the consensus protocol described herein. Moreover, in some embodiments, the blockchain network 401 may include a trusted controller node 410 that records join-time parameters $402_1$-$402_n$ for each peer node, as well as performing authentication and random number generation if required. In other embodiment, each peer node $402_1$-$402_n$ records the join-time parameters and performs authentication, if required.

Figure 4B:
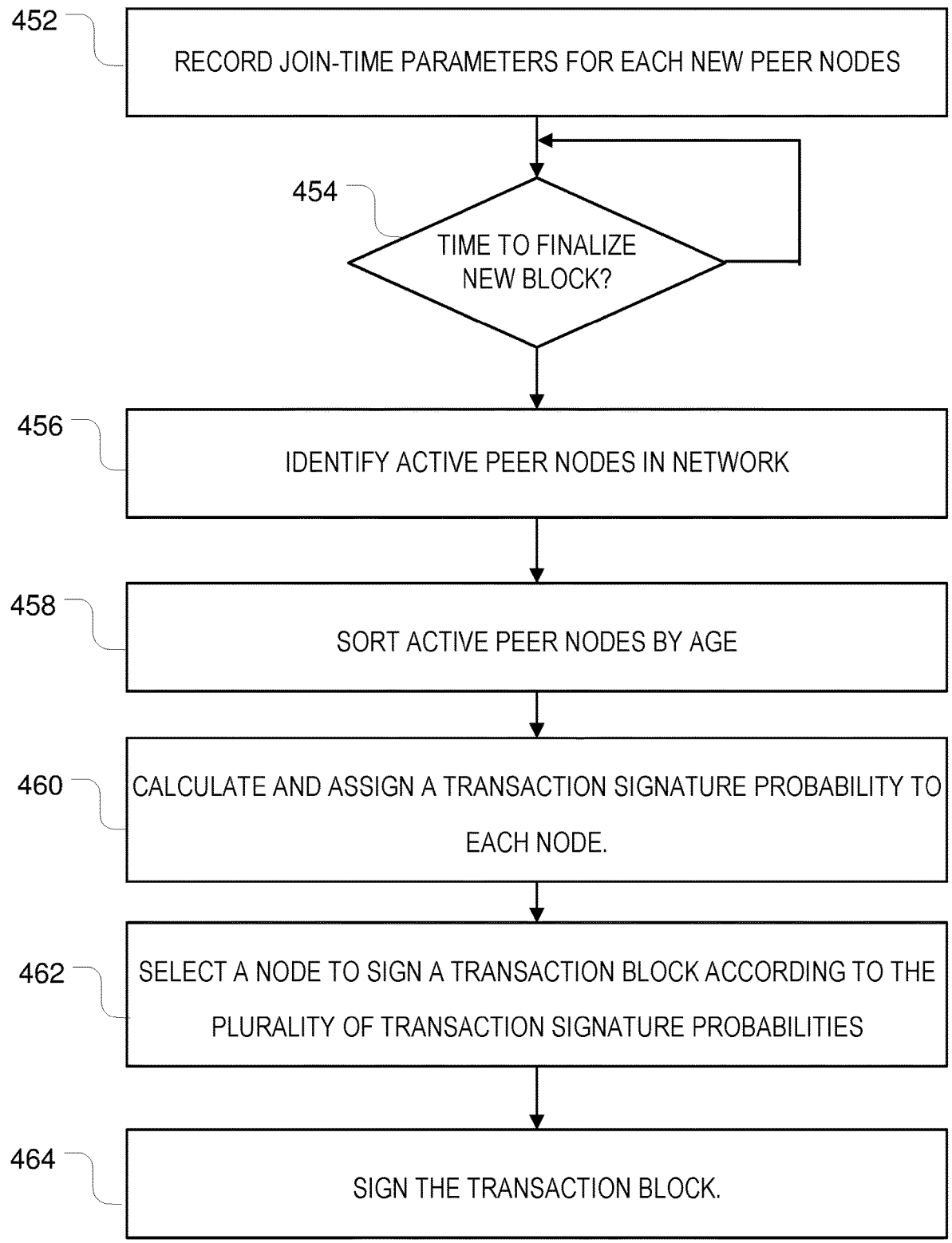
FIG. 4B is a flow chart illustrating the blockchain network of FIG. 4A in operation, consistent with some embodiments.

FIG. 4B is a flow chart 450 illustrating the blockchain network 401 of FIG. 4A in operation, consistent with some embodiments. At 452, each new peer node 402$_n$ may make an initial broadcast to the network 400 when it joins the blockchain network. The other peer nodes 402$_1$-402$_{n-1}$ and/or the coordination node 410 may record the identity of the new node 402$_n$ and its join-time parameters 420$_n$. In some embodiments, the recorded join-time parameters 420$_n$ may be the most recent joining time in the blockchain network 400 for the node 402$_n$. These embodiments may be desirable for some applications because they overweight the more technically sophisticated and capable peer nodes 402$_1$-402$_n$ (e.g., a modern mainframe computer having redundant, hot-swappable components as compared to a consumer grade laptop computer). In other embodiments, the recorded join-time parameters 420$_n$ may be a time of the peer node's 402$_n$ initial application to join the network 401 e.g., the time at which the peer node 402$_n$ requested a user-id for this specific blockchain network 400. These embodiments may be desirable in some applications because they overweight the founding members of the specific blockchain network 400 as compared to an ordinary user.

When the blockchain network 401 determines at 454 that it is time to finalize a new transaction block 404$_n$, the network 401 first determines at 456 which peer nodes 402$_1$-402$_n$ are currently active in the network 401. This determination may include the coordination node 410 broadcasting a request for acknowledgement from all of the other peer nodes 402$_1$-402$_n$. At 458-460, the coordination node 410 and/or each peer may generate a transaction signature probability (TSP) for each active peer node 402$_1$-402$_n$ in the blockchain network 401. In some embodiments, the coordination node 410 and/or each peer node may first sort the active peer nodes 402$_1$-402$_n$ by age using the join-time parameters. The coordination node 410 and/or each peer node may then calculate a relative transaction signature probability (TSP) for each peer node 402$_1$-402$_n$ using the join-time parameters per following formula:

$$p(n) = \frac{\text{actual time} - \text{joining time}_n}{\sum_{m=0}^{n}(\text{actual time} - \text{joining time}_m)}$$

Thus, in one example network 401 with four peer nodes, the resulting transaction signature probabilities might be:
P(1)=.0000-0.0020
P(2)=0.0021-0.0700
P(3)=0.0701-0.9802
P(4)=.9803-1.0000

At 462, the coordination node 410 may then generate a random number between 0 and 1 in some embodiments, determine which peer node 402$_1$-402$_n$ is associated with that random number, and then inform all of the peer node 402$_1$-402$_n$ in the network 401 which specific node will sign the new transaction block 404$_n$. Alternatively, in some embodiments, the coordination node 410 and/or each peer node 402$_1$-402$_n$ may perform a calculation on information available to all peer nodes 402$_1$-402$_n$, such as a predetermined/hash function that uses the new transaction block 404$_n$ or a portion thereof as input, to determine which peer node will sign the new block 404). These later embodiments may be desirable in applications where the coordination node 410 is not used and/or not fully trusted. At 464, the selected peer node will then sign the new transaction block 404», together with a hash of the previous block 404$_{n-1}$, and then broadcast the signature to the entire blockchain network 401.

The embodiments described with reference to FIGS. 4A and 4B may be particularly desirable for some applications because they are resistant to so-called 51% attacks. That is, consensus protocols like proof-of-work are vulnerable if someone is able to collect over half of the computing power in the blockchain network, which would then allow the attacker rewrite a previous block. While this scenario is unlikely in big networks, small networks remain vulnerable. The proof-of-age protocols described with reference to FIGS. 4A and 4B, in contrast, select nodes based in part on the immutable physical properties, and thus, should be resistant to that form of attack.

The embodiments described with reference to FIGS. 4A and 4B may also be desirable for some applications because they are highly energy efficient. That is, consensus protocols like proof-of-work require that peers (or, a subset of peers called miners) perform a complex, but useless, computational problem in order to select which peer will sign a new block of transactions into the blockchain. These computational problems, however, require energy to perform, which can be significant in aggregate, particularly for the larger networks. Security in the proof-of-age protocols described with reference to FIGS. 4A and 4B, in contrast, is based on spreading the chances of winning fairly across the largest possible number of network participants, as well as the probability that a node of some trusted company has a higher age time, unlike an ordinary user.

Example Blockchain Systems

Figure 5A:
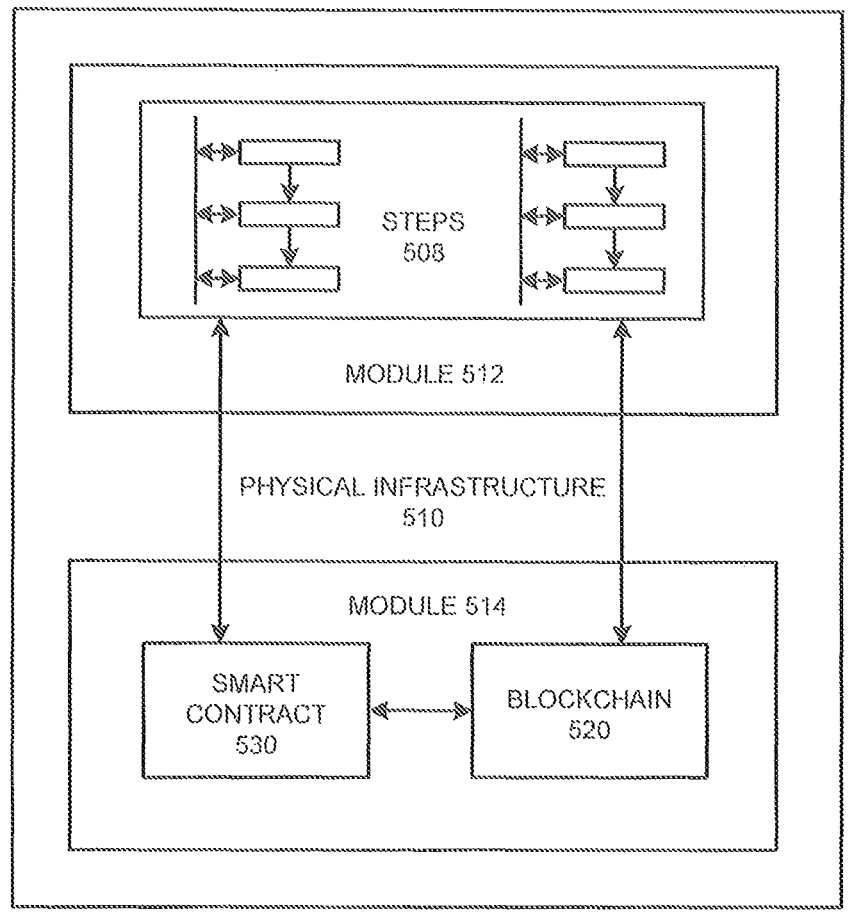
FIG. 5A illustrates an example system configured to perform one or more operations described herein, according to example embodiments.

FIG. 5A illustrates an example system 500 that includes a physical infrastructure 510 configured to perform various operations according to example embodiments. Referring to FIG. 3A, the physical infrastructure 510 includes a module 512 and a module 514. The module 514 includes a blockchain 520 and a smart contract 530 (which may reside on the blockchain 520), that may execute any of the operational steps 508 (in module 512) included in any of the example embodiments. The steps/operations 508 may include one or more of the embodiments described or depicted and may represent output or written information that is written or read from one or more smart contracts 530 and/or blockchains 520. The physical infrastructure 510, the module 512, and the module 514 may include one or more computers, servers, processors, memories, and/or wireless communication devices. Further, the module 512 and the module 514 may be a same module.

Figure 5B:
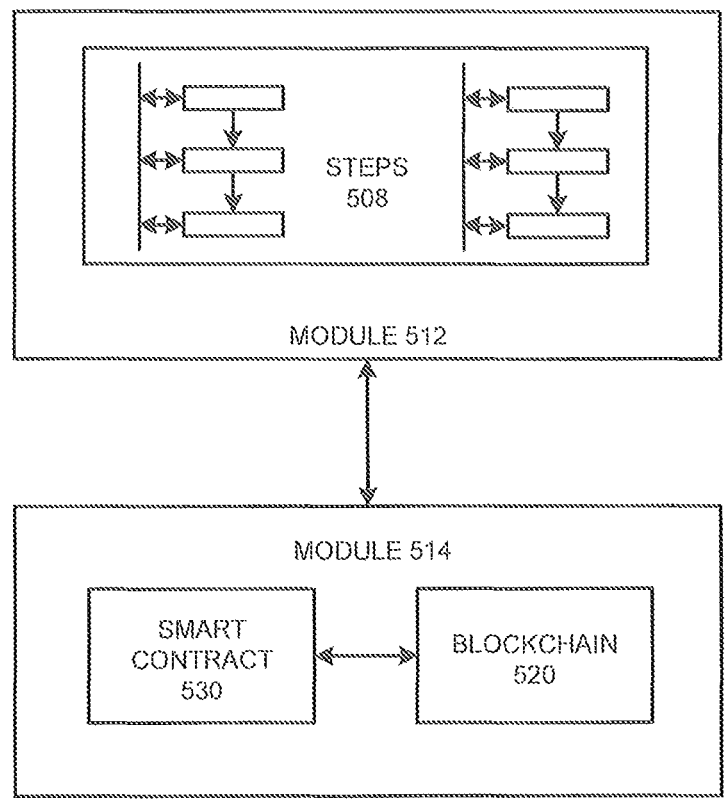
FIG. 5B illustrates another example system configured to perform one or more operations described herein, according to example embodiments.

FIG. 5B illustrates another example system 540 configured to perform various operations according to example embodiments. Referring to FIG. 5B, the system 540 includes a module 512 and a module 514. The module 514 includes a blockchain 520 and a smart contract 530 (which may reside on the blockchain 520), that may execute any of the operational steps 508 (in module 512) included in any of the example embodiments. The steps/operations 508 may include one or more of the embodiments described or depicted and may represent output or written information that is written or read from one or more smart contracts 530 and/or blockchains 520. The physical module 512 and the module 514 may include one or more computers, servers, processors, memories, and/or wireless communication devices. Further, the module 512 and the module 514 may be a same module.

Figure 5C:
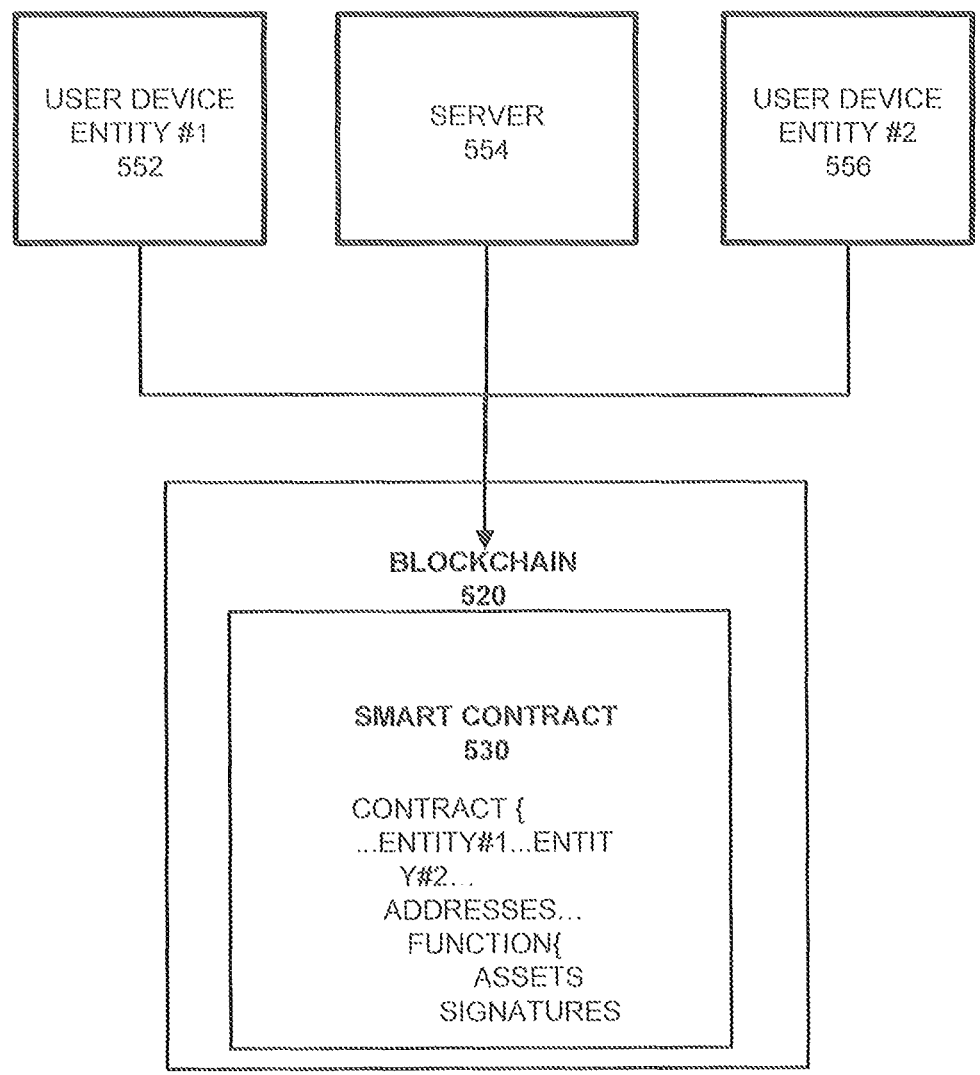
FIG. 5C illustrates a further example system configured to utilize a smart contract, according to example embodiments.

FIG. 5C illustrates an example system configured to utilize a smart contract configuration among contracting parties and a mediating server configured to enforce the smart contract terms on the blockchain according to example embodiments. Referring to FIG. 5C, the configuration 550 may represent a communication session, an asset transfer session or a process or procedure that is driven by a smart contract 530, which explicitly identifies one or more user devices 552 and/or 556. The execution, operations and results of the smart contract execution may be managed by a server 554. Content of the smart contract 530 may require digital signatures by one or more of the entities (e.g., devices 552 and/or 556, and/or their respective users/owners) that are parties to the smart contract transaction. The results of the smart contract execution may be written to a blockchain 520 as a blockchain transaction. The smart contract 530 resides on the blockchain 520 which may reside on one or more computers, servers, processors, memories, and/or wireless communication devices.

Figure 5D:
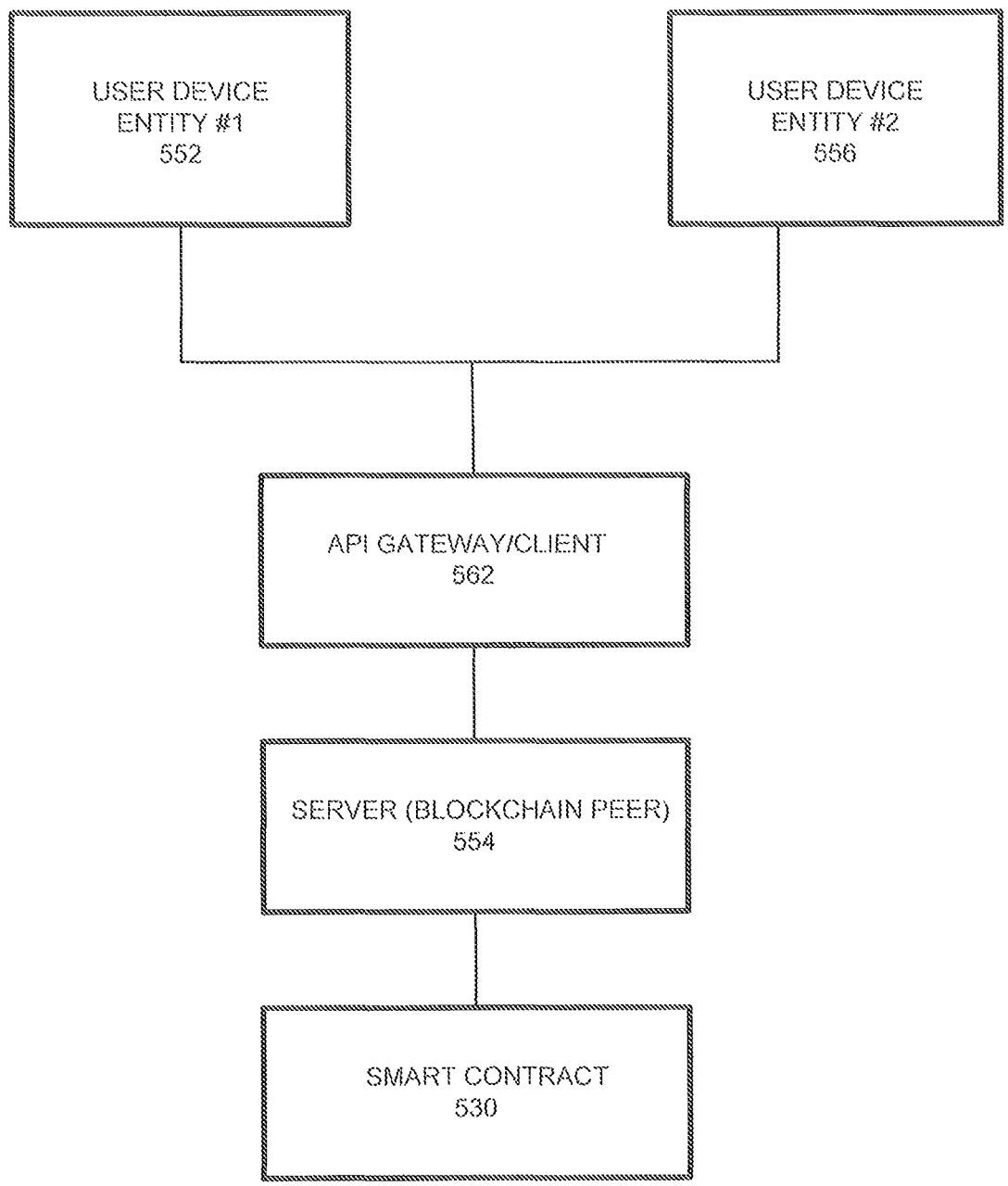
FIG. 5D illustrates yet another example system configured to utilize a blockchain, according to example embodiments.

FIG. 5D illustrates a system 560 including a blockchain, according to example embodiments. Referring to the example of FIG. 5D, an application programming interface (API) gateway 562 provides a common interface for accessing blockchain logic (e.g., smart contract 530 or other chaincode) and data (e.g., distributed ledger, etc.). In this example, the API gateway 562 is a common interface for performing transactions (invoke, queries, etc.) on the blockchain by connecting one or more entities 552 and 556 to a blockchain peer (i.e., server 554). Here, the server 554 is a blockchain network peer component that holds a copy of the world state and a distributed ledger allowing clients 552 and 556 to query data on the world state as well as submit transactions into the blockchain network where, depending on the smart contract 530 and endorsement policy, endorsing peers will run the smart contracts 530.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Blockchain Processing

Figure 6A:
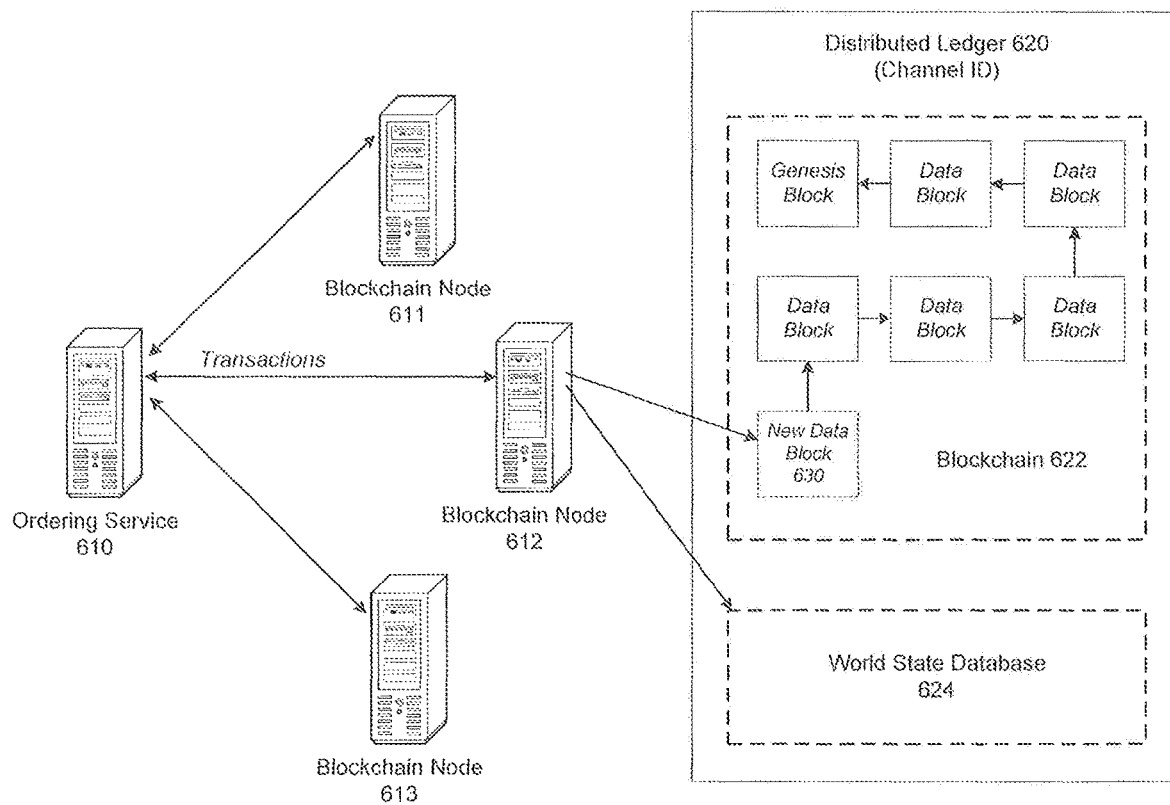
FIG. 6A illustrates a process for a new block being added to a distributed ledger, according to example embodiments.
Figure 6B:
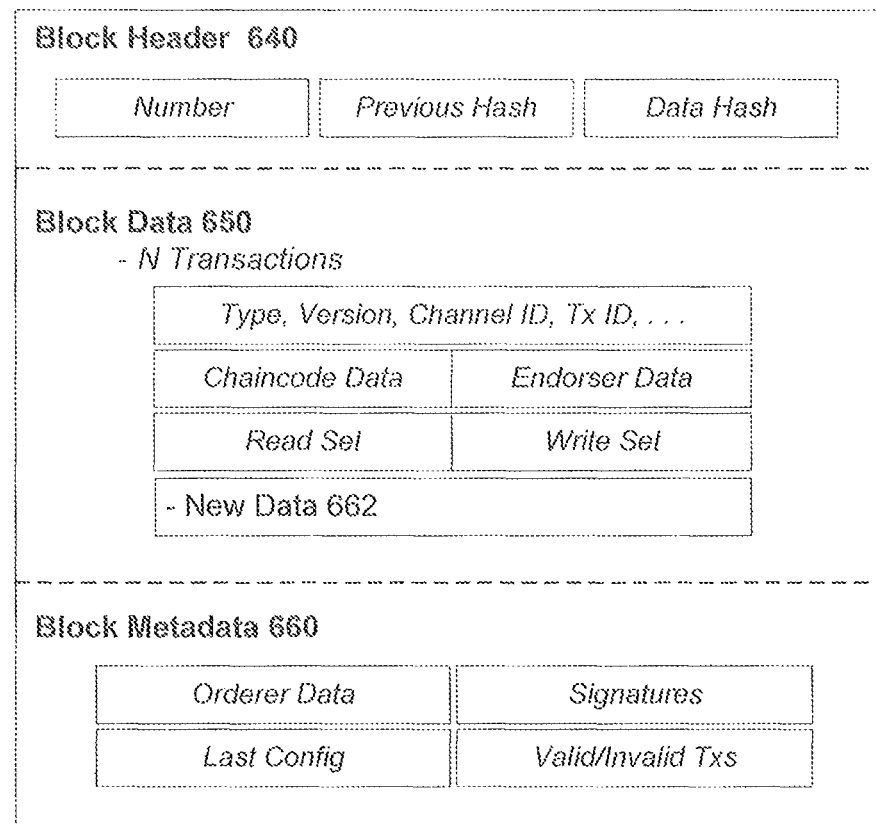
FIG. 6B illustrates contents of a new data block, according to example embodiments.

FIG. 6A illustrates a process 600 of a new block being added to a distributed ledger 620, according to some embodiments, and FIG. 6B illustrates contents of a new data block structure 630 for blockchain, according to some embodiments. The new data block 630 may contain document linking data.

Referring to FIG. 6A, clients (not shown) may submit transactions to blockchain nodes 611, 612, and/or 613. Clients may be instructions received from any source to enact activity on the blockchain 622. As an example, clients may be applications that act on behalf of a requester, such as a device, person or entity to propose transactions for the blockchain. The plurality of blockchain peers (e.g., blockchain nodes 611, 612, and 613) may maintain a state of the blockchain network and a copy of the distributed ledger 620. Different types of blockchain nodes/peers may be present in the blockchain network including endorsing peers which simulate and endorse transactions proposed by clients and committing peers which verify endorsements, validate transactions, and commit transactions to the distributed ledger 620. In some embodiments, the blockchain nodes 611, 612, and 613 may perform the role of endorser node, committer node, or both.

The distributed ledger 620 may include a blockchain which stores immutable, sequenced records in blocks, and a state database 624 (current world state) maintaining a current state of the blockchain 622. One distributed ledger 620 may exist per channel and each peer maintains its own copy of the distributed ledger 620 for each channel of which they are a member. The blockchain 622 may be a transaction log, structured as hash-linked blocks where each block contains a sequence of N transactions. Blocks may include various components such as shown in FIG. 6B. The linking of the blocks (shown by arrows in FIG. 6A) may be generated by adding a hash of a prior block's header within a block header of a current block. In this way, all transactions on the blockchain 622 may be sequenced and cryptographically linked together preventing tampering with blockchain data without breaking the hash links. Furthermore, because of the links, the latest block in the blockchain 622 represents every transaction that has come before it. The blockchain 622 may be stored on a peer file system (local or attached storage), which supports an append-only blockchain workload.

The current state of the blockchain 622 and the distributed ledger 620 may be stored in the state database 624. Here, the current state data represents the latest values for all keys ever included in the chain transaction log of the blockchain 622. Chaincode invocations execute transactions against the current state in the state database 624. To make these chaincode interactions more efficient, the latest values of all keys may be stored in the state database 624. The state database 624 may include an indexed view into the transaction log of the blockchain 622, it can therefore be regenerated from the chain at any time. The state database 624 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing node creates a transaction endorsement, which is a signed response from the endorsing node to the client application indicating the endorsement of the simulated transaction. The method of endorsing a transaction depends on an endorsement policy that may be specified within chaincode. An example of an endorsement policy is "the majority of endorsing peers must endorse the transaction." Different channels may have different endorsement policies. Endorsed transactions are forward by the client application to ordering service 610.

The ordering service 610 accepts endorsed transactions, orders them into a block, and delivers the blocks to the committing peers. For example, the ordering service 610 may initiate a new block when a threshold of transactions has been reached, a timer times out, or another condition. In the example of FIG. 6A, blockchain node 612 is a committing peer that has received a new data new data block 630 for storage on blockchain 622. The first block in the blockchain may be referred to as a genesis block, which includes information about the blockchain, its members, the data stored therein, etc.

The ordering service 610 may be made up of a cluster of orderers. The ordering service 610 in some embodiments may not process transactions, smart contracts, or maintain the shared ledger. Rather, the ordering service 610 in these embodiments may accept the endorsed transactions and specify the order in which those transactions are committed to the distributed ledger 620. The architecture of the blockchain network may be designed such that the specific implementation of 'ordering' (e.g., Solo, Kafka, BFT, etc.) becomes a pluggable component.

Transactions in some embodiments may be written to the distributed ledger 620 in a consistent order. The order of transactions in these embodiments may be established to ensure that the updates to the state database 624 are valid when they are committed to the network. Unlike a cryptocurrency blockchain system (e.g., Bitcoin, etc.), where ordering occurs through the solving of a cryptographic puzzle, or mining, in this example the parties of the distributed ledger 620 may choose the ordering mechanism that best suits that network.

In some embodiments, when the ordering service 610 initializes a new data block 630, the new data block 630 may be broadcast to committing peers (e.g., blockchain nodes 611, 612, and 613). In response, each committing peer may validate the transaction within the new data block 630 by checking to make sure that the read set and the write set still match the current world state in the state database 624. Specifically, the committing peer may determine whether the read data that existed when the endorsers simulated the transaction is identical to the current world state in the state database 624. When the committing peer validates the transaction, the transaction may be written to the blockchain 622 on the distributed ledger 620, and the state database 624 may be updated with the write data from the read-write set. In some embodiments, if a transaction fails (e.g., if the committing peer finds that the read-write set does not match the current world state in the state database 624), the transaction ordered into a block may still be included in that block, but marked as invalid, and the state database 624 not updated.

Referring to FIG. 6B, a new data block 630 (also referred to as a data block) that is stored on the blockchain 622 of the distributed ledger 620 may include multiple data segments in some embodiments, such as a block header 640, block data 650, and block metadata 660. It should be appreciated that the various depicted blocks and their contents, such as new data block 630 and its contents, shown in FIG. 6B are merely examples and are not meant to limit the scope of the example embodiments. The new data block 630 may store transactional information of N transaction(s) (e.g., 1, 10, 100, 200, 1000, 2000, 3000, etc.) within the block data 650. The new data block 630 may also include a link to a previous block (e.g., on the blockchain 622 in FIG. 6A) within the block header 640. In particular, the block header 640 may include a hash of a previous block's header. The block header 640 may also include a unique block number, a hash of the block data 650 of the new data block 630, and the like. The block number of the new data block 630 may be unique and assigned in various orders, such as an incremental/sequential order starting from zero.

The block data 650 may store transactional information of each transaction that is recorded within the new data block 630. For example, the transaction data may include one or more of: a type of the transaction, a version, a timestamp, a channel ID of the distributed ledger 620, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 650 may also store new data 662, which adds additional information to the hash-linked chain of blocks in the blockchain 622. The additional information may include one or more of the steps, features, processes and/or actions described or depicted herein. Accordingly, the new data 662 may be stored in an immutable log of blocks on the distributed ledger 620. Some of the benefits of storing such new data 662 are reflected in the various embodiments disclosed and depicted herein. Although in FIG. 6B the new data 662 is depicted in the block data 650, it could also be located in the block header 640 or the block metadata 660 in some embodiments. The new data 662 may also include a document composite key that is used for linking the documents within an organization.

The block metadata 660 may store multiple fields of metadata (e.g., as a byte array, etc.). Metadata fields may include: signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 610. Meanwhile, a committer of the block (such as blockchain node 612) may add validity/invalidity information based on an endorsement policy, verification of read/write sets, and the like. The transaction filter may include a byte array of a size equal to the number of transactions in the block data 650 and a validation code identifying whether a transaction was valid/invalid.

Figure 6C:
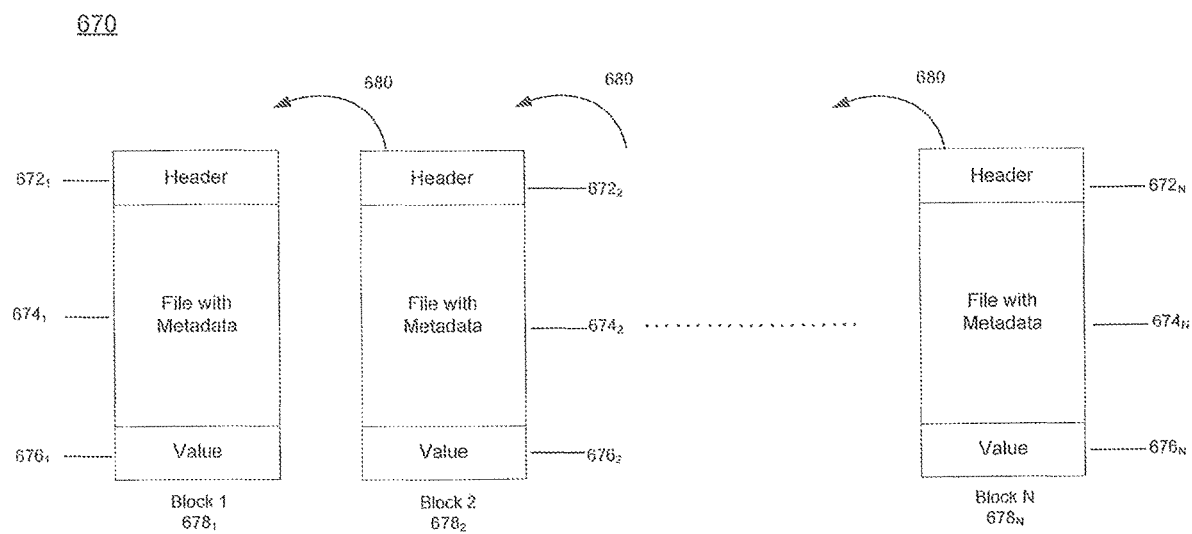
FIG. 6C illustrates a blockchain for digital content, according to example embodiments.

FIG. 6C illustrates an embodiment of a blockchain 670 for digital content in accordance with some embodiments. The digital content may include one or more files and associated information. The files may include media, images, video, audio, text, links, graphics, animations, web pages, documents, or other forms of digital content. The immutable, append-only aspects of some blockchain embodiments may be desirable to serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain in these embodiments may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value . . . Content |
| . | . |
| . | . |
| . | . |
| Block N Hash Value | Block N Hash Value . . . Content |

In the example embodiment of FIG. 6C, the blockchain 670 includes a number of blocks $678_1$, $678_2$, . . . $678_N$ cryptographically linked in an ordered sequence, where N≥1. The encryption used to link the blocks $678_1$, $678_2$, . . . $678_N$ may be any of a number of keyed or un-keyed Hash functions. In one embodiment, the blocks $678_1$, $678_2$, . . . $678_N$ are subject to a hash function which produces n-bit alphanumeric outputs (where n is 256 or another number) from inputs that are based on information in the blocks. Examples of such a hash function include, but are not limited to: a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $678_1$, $678_2$, . . . , $678_N$ may be cryptographically linked by a function that is different from a hash function. For purposes of illustration, the following description is made with reference to a hash function, e.g., SHA-2.

Each of the blocks $678_1$, $678_2$, . . . , $678_N$ in the blockchain may include a header, a version of the file, and a value. The header and the value may be different for each block as a result of hashing in the blockchain. In one embodiment, the value may be included in the header. As described in greater detail below, the version of the file may be the original file or may be a different version of the original file.

The first block $678_1$ in the blockchain is referred to as the genesis block and may include the header $672_1$, original file $674_1$, and an initial value $676_1$. The hashing scheme used for the genesis block, and indeed in all subsequent blocks, may vary. For example, all the information in the first block $678_1$ may be hashed together and at one time, or each or a portion of the information in the first block $678_1$ may be separately hashed and then a hash of the separately hashed portions may be performed.

The header $672_1$ may include one or more initial parameters, which, for example, may include a version number, timestamp, nonce, root information, difficulty level, consensus protocol, duration, media format, source, descriptive keywords, and/or other information associated with original file $674_1$ and/or the blockchain. The header $672_1$ may be generated automatically (e.g., by blockchain network managing software) or manually by a blockchain participant. Unlike the header in other blocks $678_2$ to $678_N$ in the blockchain, the header $672_1$ in the genesis block may not reference a previous block, simply because there is no previous block.

The original file $674_1$ in the genesis block may be, for example, data as captured by a device with or without processing prior to its inclusion in the blockchain. The original file $674_1$ may be received through the interface of the system from the device, media source, or node. The original file $674_1$ may be associated with metadata, which, for example, may be generated by a user, the device, and/or the system processor, either manually or automatically. The metadata may be included in the first block $678_1$ in association with the original file $674_1$.

The value $676_1$ in the genesis block may be an initial value generated based on one or more unique attributes of the original file $674_1$. In one embodiment, the one or more unique attributes may include the hash value for the original file $674_1$, metadata for the original file $674_1$, and other information associated with the file. In one implementation, the initial value $676_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks $678_2$ to $678_N$ in the blockchain also have headers, files, and values. However, unlike the header $672_1$ for the first block, each of the headers $672_2$ to $672_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 680, to establish an auditable and immutable chain-of-custody.

Each of the header $672_2$ to $672_N$ in the other blocks may also include other information, e.g., version number, timestamp, nonce, root information, difficulty level, consensus protocol, and/or other parameters or information associated with the corresponding files and/or the blockchain in general.

The files $674_2$ to $674_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata.

Processing which involves analyzing a file may include, for example, appending, including, or otherwise associating various analytics, statistics, or other information associated with the file.

The values in each of the other blocks $676_2$ to $676_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 6D:
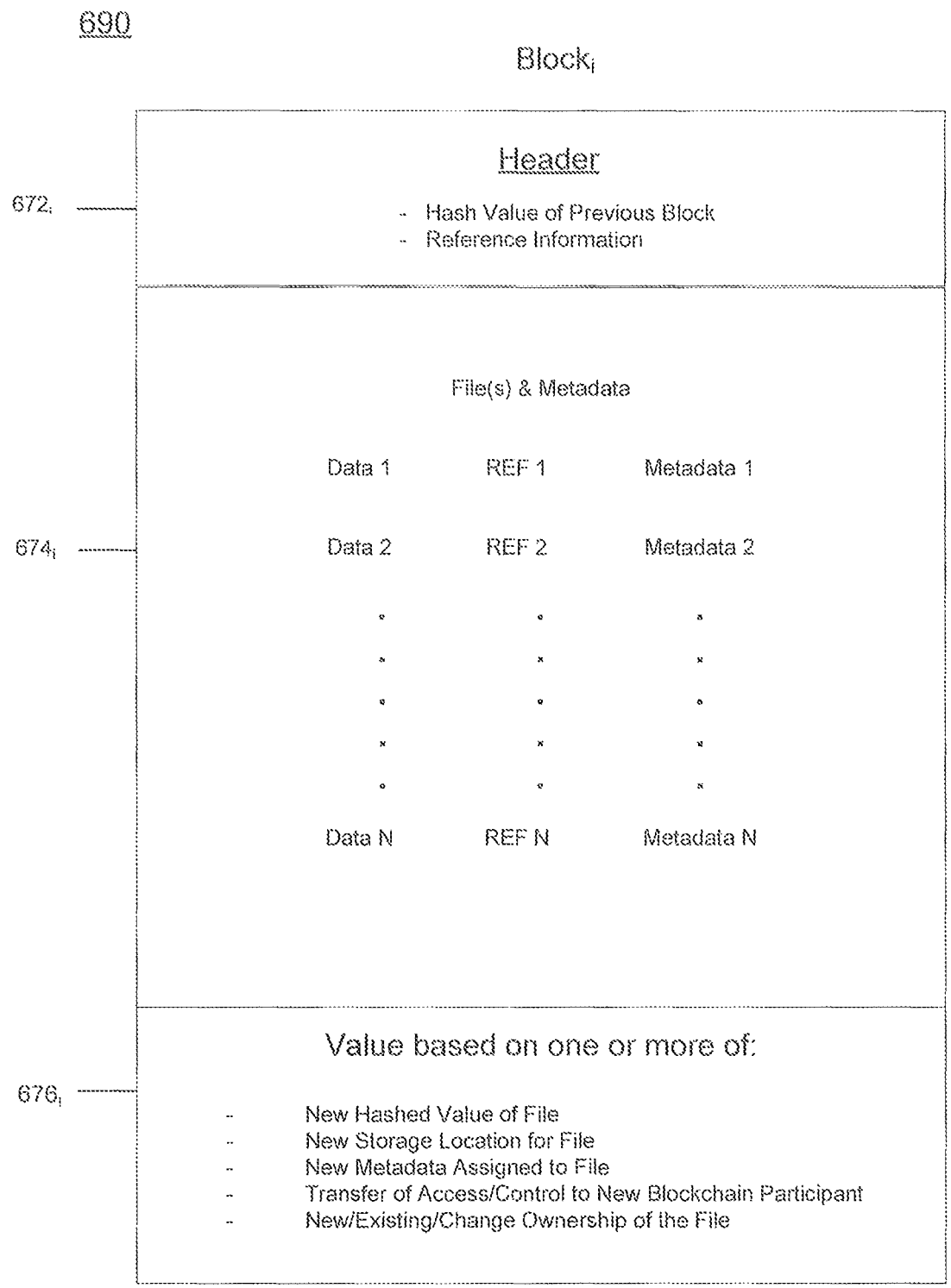
FIG. 6D illustrates a block which may represent the structure of blocks in the blockchain, according to example embodiments.

In one embodiment, the value of a previous block may be updated (e.g., a new hash value computed) to form the value of a current block when any one or more of the following occurs. The new hash value may be computed by hashing all or a portion of the information noted below, in this example embodiment.
  a) new SHA-2 computed hash value if the file has been processed in any way (e.g., if the file was redacted, copied, altered, accessed, or some other action was taken)
  b) new storage location for the file
  c) new metadata identified associated with the file
  d) transfer of access or control of the file from one blockchain participant to another blockchain participant FIG. 6D illustrates an embodiment of a block, which may represent the structure of the blocks in the blockchain 690, in accordance with some embodiments. The block, $Block_i$, may include a header $672_i$, a file $674_i$, and a value $676_i$.

The header $672_i$ may include a hash value of a previous block $Block_{i-1}$ and additional reference information, which, for example, may be any of the types of information (e.g., header information including references, characteristics, parameters, etc.) discussed herein. All blocks in some embodiments may reference the hash of a previous block except the genesis block in some embodiments. The hash value of the previous block may be just a hash of the header in the previous block or a hash of all or a portion of the information in the previous block, including the file and metadata.

The file $674_i$ may include a plurality of data, such as Data 1, Data 2, . . . . Data N in sequence. The data are tagged with Metadata 1, Metadata 2, . . . . Metadata N, which describe the content and/or characteristics associated with the data. For example, the metadata for each data may include: information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference $REF_1$, $REF_2$ . . . . $REF_N$ to a previous data to prevent tampering, gaps in the file, and sequential reference through the file.

Once the metadata is assigned to the data (e.g., through a smart contract), the metadata cannot be altered without the hash changing in some embodiments, which can easily be identified for invalidation. The metadata in these embodiments, thus, creates a data log of information that may be accessed for use by participants in the blockchain.

The value $676_i$ in some embodiments may be a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 670 is formed, at any point in time, the immutable chain-of-custody for the file may be obtained by querying the blockchain for the transaction history of the values across the blocks in some embodiments. This query, or tracking procedure, may begin with decrypting the value of the block that is most currently included (e.g., the last (Nth) block), and then continuing to decrypt the value of the other blocks until the genesis block is reached and the original file is recovered. The decryption may involve decrypting the headers and files and associated metadata at each block, as well.

Decryption may be performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key may be associated with each other through some mathematical relationship. The public key may be distributed publicly to serve as an address to receive messages from other users, e.g., an IP address or home address. The private key may be kept secret and may be used to digitally sign messages sent to other blockchain participants. The signature, in turn, may be included in the message so that the recipient can verify using the public key of the sender. This way, the recipient can be confident that only the sender could have sent this message.

In some embodiments, generating a key pair may be analogous to creating an account on the blockchain, but without having to actually register anywhere. In these embodiments, every transaction that is executed on the blockchain may be digitally signed by the sender using their private key. This signature may help ensure that only the owner of the account can track and process (if within the scope of permission determined by a smart contract) the file of the blockchain.

Example Blockchain Applications

Figure 7A:
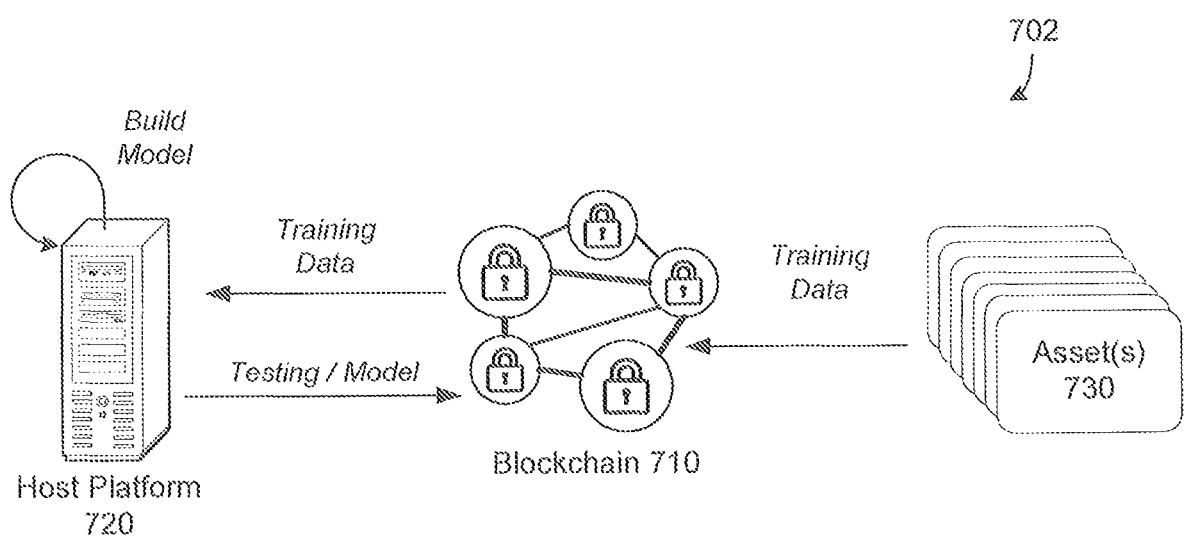
FIG. 7A illustrates an example blockchain which stores machine learning (artificial intelligence) data, according to example embodiments.
Figure 7A:
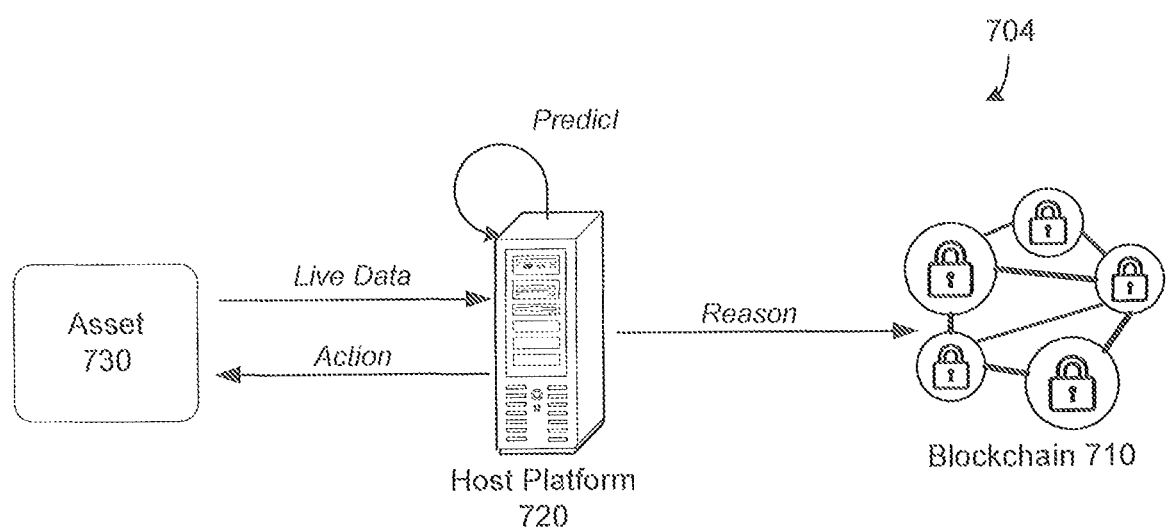
Figure 7B:
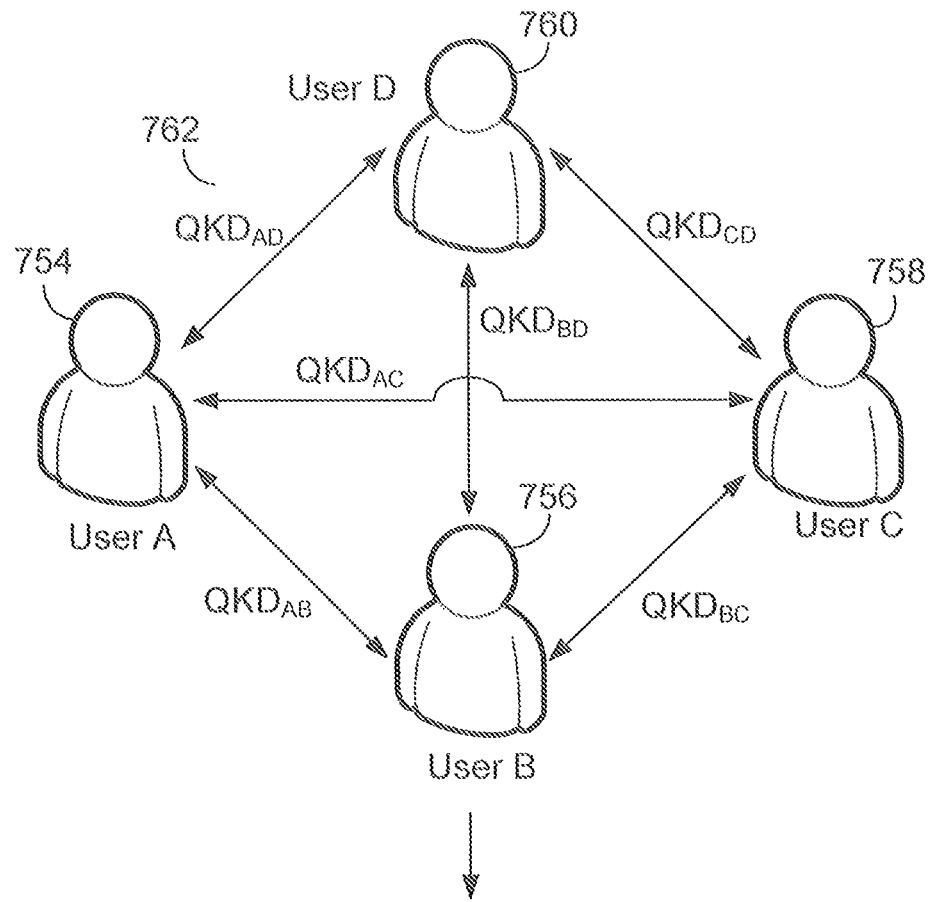
FIG. 7B illustrates an example quantum-secure blockchain, according to example embodiments.
Figure 7B:
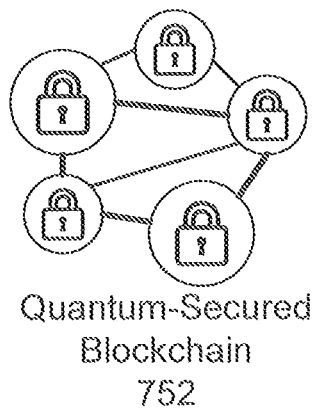

FIGS. 7A and 7B illustrate additional examples of use cases for blockchain, which may be incorporated and used herein. In particular, FIG. 7A illustrates an example 700 of a blockchain 710 that stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 7A, a host platform 720 may build and deploy a machine learning model for predictive monitoring of assets 730. Here, the host platform 720 may be a cloud platform, an industrial server, a web server, a personal computer, a user device, and the like. Assets 730 can be any type of asset (e.g., machine or equipment, etc.) such as: an aircraft, locomotive, turbine, medical machinery and equipment, oil and gas equipment, boats, ships, vehicles, and the like. As another example, assets 730 may be non-tangible assets, such as: stocks, currency, digital coins, insurance, or the like.

The blockchain 710 in this embodiment may be used to significantly improve both a training process 702 of the machine learning model and a predictive process 704 based on a trained machine learning model. For example, in 702, rather than requiring a data scientist/engineer or other user to collect the data, historical data may be stored by the assets 730 themselves (or through an intermediary, not shown) on the blockchain 710. This may significantly reduce the collection time needed by the host platform 720 when performing predictive model training. For example, using smart contracts, data can be directly and reliably transferred straight from its place of origin to the blockchain 710. By using the blockchain 710 to ensure the security and ownership of the collected data, smart contracts may directly send the data from the assets to the individuals that use the data for building a machine learning model. This may allow for sharing of data among the assets 730.

The collected data may be stored in the blockchain 710 based on a consensus protocol. The consensus protocol pulls in (permissioned nodes) to ensure that the data being recorded is verified and accurate. The data recorded is time-stamped, cryptographically signed, and immutable. It is therefore auditable, transparent, and secure. Adding IoT devices that write directly to the blockchain may, in certain cases (i.e. supply chain, healthcare, logistics, etc.), increase both the frequency and accuracy of the data being recorded.

Furthermore, training of the machine learning model on the collected data may take rounds of refinement and testing by the host platform 720. Each round may be based on additional data or data that was not previously considered to help expand the knowledge of the machine learning model. In 702, the different training and testing steps (and the data associated therewith) may be stored on the blockchain 710 by the host platform 720. Each refinement of the machine learning model (e.g., changes in variables, weights, etc.) may be stored on the blockchain 710. This provides verifiable proof of how the model was trained and what data was used to train the model. Furthermore, when the host platform 720 has achieved a finally trained model, the resulting model may be stored on the blockchain 710.

After the model has been trained, it may be deployed to a live environment where it can make predictions/decisions based on the execution of the final trained machine learning model. For example, in 704, the machine learning model may be used for condition-based maintenance (CBM) for an asset such as an aircraft, a wind turbine, a healthcare machine, and the like. In this example, data fed back from the asset 730 may be input the machine learning model and used to make event predictions such as failure events, error codes, and the like. Determinations made by the execution of the machine learning model at the host platform 720 may be stored on the blockchain 710 to provide auditable/verifiable proof. As one non-limiting example, the machine learning model may predict a future breakdown/failure to a part of the asset 730 and create alert or a notification to replace the part. The data behind this decision may be stored by the host platform 720 on the blockchain 710. In one embodiment the features and/or the actions described and/or depicted herein can occur on or with respect to the blockchain 710.

New transactions for a blockchain can be gathered together into a new block and added to an existing hash value. This is then encrypted to create a new hash for the new block. This is added to the next list of transactions when they are encrypted, and so on. The result is a chain of blocks that each contain the hash values of all preceding blocks. Computers that store these blocks regularly compare their hash values to ensure that they are all in agreement. Any computer that does not agree, discards the records that are causing the problem. This approach is good for ensuring tamper-resistance of the blockchain, but it is not perfect.

One way to game this system is for a dishonest user to change the list of transactions in their favor, but in a way that leaves the hash unchanged. This can be done by brute force, in other words by changing a record, encrypting the result, and seeing whether the hash value is the same. And if not, trying again and again and again until it finds a hash that matches. The security of blockchains is based on the belief that ordinary computers can only perform this kind of brute force attack over time scales that are entirely impractical, such as the age of the universe. By contrast, quantum computers are much faster (1000$s$ of times faster) and consequently pose a much greater threat.

FIG. 7B illustrates an example 750 of a quantum-secure blockchain 752 which implements quantum key distribution (QKD) to protect against a quantum computing attack. In this example, blockchain users can verify each other's identities using QKD. This sends information using quantum particles such as photons, which cannot be copied by an eavesdropper without destroying them. In this way, a sender and a receiver through the blockchain can be sure of each other's identity.

In the example of FIG. 4B, four users are present 754, 756, 758, and 760. Each of pair of users may share a secret key 762 (i.e., a QKD) between themselves. Since there are four nodes in this example, six pairs of nodes exist, and therefore six different secret keys 762 are used including $QKD_{AB}$, $QKD_{AC}$, $QKD_{AD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the blockchain 752 is based on two procedures (i) creation of transactions, and (ii) construction of blocks that aggregate the new transactions. New transactions may be created similar to a traditional blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 754-760) authenticate the transaction by providing their shared secret key 762 (QKD). This quantum signature can be attached to every transaction making it exceedingly difficult to tamper with. Each node checks their entries with respect to a local copy of the blockchain 752 to verify that each transaction has sufficient funds. However, the transactions are not yet confirmed.

Rather than perform a traditional mining process on the blocks, the blocks may be created in a decentralized manner using a broadcast protocol. At a predetermined period of time (e.g., seconds, minutes, hours, etc.) the network may apply the broadcast protocol to any unconfirmed transaction thereby to achieve a Byzantine agreement (consensus) regarding a correct version of the transaction. For example, each node may possess a private value (transaction data of that particular node). In a first round, nodes transmit their private values to each other. In subsequent rounds, nodes communicate the information they received in the previous round from other nodes. Here, honest nodes are able to create a complete set of transactions within a new block. This new block can be added to the blockchain 752. In one embodiment the features and/or the actions described and/or depicted herein can occur on or with respect to the blockchain 752.

Computer Program Product

Although the present invention has been described in detail with reference to certain examples thereof, it may be also embodied in other specific forms without departing from the essential spirit or attributes thereof. For example, the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

General

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects of the present invention were described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. Moreover, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

What is claimed is:

1. A computer-implemented method for selecting a blockchain node to sign a transaction block, the method comprising
    recording join-time parameters for a plurality of blockchain nodes;
    comparing, by a computer processor, a first join-time parameter for a first node of the plurality of blockchain nodes to the join-time parameters for a remainder of the plurality of blockchain nodes;
    calculating, by the computer processor based on the comparison of the join-time parameters, a transaction signature probability (TSP) for one or more nodes within the plurality of blockchain nodes;
    selecting, by the computer processor according to the calculated TSPs, a signature node from among the one or more nodes to sign a transaction block, wherein the calculated TSPs reflect an increased chance for selection as the signature node, according to respective ages of the join-time parameters; and
    calculating, by the selected signature node, a digital signature for the transaction block.

2. The method of claim 1, wherein the join-time parameters comprise a plurality of timestamps corresponding to a time when each node of the plurality of blockchain nodes joined a blockchain system.

3. The method of claim 1, wherein the join-time parameters comprise a plurality of timestamps corresponding to a most recent time when each node of the plurality of blockchain nodes joined a blockchain system.

4. The method of claim 1, wherein the join-time parameters comprise a plurality of timestamps corresponding to a time when each node of the plurality of blockchain nodes initially joined a blockchain system.

5. The method of claim 1, wherein selecting the signature node comprises:
    calculating a hash from information known to each node within the plurality of blockchain nodes;
    comparing the hash to the calculated TSPs.

6. The method of claim 1, wherein calculating the TSP comprises:
    identifying one or more active nodes within the plurality of blockchain nodes sorting the one or more active peer nodes by age using the join-time parameters;

calculating a relative TSP for each of the one or more active peer nodes using an actual time and the join-time parameters, wherein the relative TSPs are calculated using the formula:

$$p(n) = \frac{\text{actual time} - \text{joining time}_n}{\sum_{m=0}^{n}(\text{actual time} - \text{joining time}_m)}.$$

7. The method of claim 6, wherein selecting the signature node comprises:
generating, by a coordination node, a random number; and
comparing the random number to the calculated relative TSPs.

8. A distributed transaction processing system, comprising:
a peer node associated with a blockchain network, the peer node comprising:
one or more processors; and
a memory communicatively coupled to the one or more processors;
wherein the memory comprises instructions which, when executed by the one or more processors, cause the one or more processors to:
record join-time parameters for a plurality of blockchain nodes;
compare a first join-time parameter for a first node of the plurality of blockchain nodes to the join-time parameters for a remainder of the plurality of blockchain nodes;
calculate, based on the comparison of the join-time parameters, a transaction signature probability (TSP) for one or more nodes within the plurality of blockchain nodes;
select according to the calculated TSPs, a signature node from among the one or more nodes to sign a transaction block, wherein the calculated TSPs reflect an increased chance for selection as the signature node, according to respective ages of the join-time parameters; and
calculate, by the selected signature node, a digital signature for the transaction block.

9. The system of claim 8, further comprising:
a plurality of endorser nodes;
a plurality of client nodes containing program code to submit a transaction to one of the plurality of endorser nodes; and
a plurality of ordering nodes adapted to broadcast an endorsed transaction to the peer node.

10. The system of claim 8, wherein the join-time parameters comprise a plurality of timestamps corresponding to a time when each node within the plurality of blockchain nodes joined a blockchain system.

11. The system of claim 8, wherein selecting the signature node, from the plurality of blockchain nodes, to sign the transaction block, according to the calculated TSPs comprises:
calculating a hash from information known to each node within the plurality of blockchain nodes;
comparing the hash to the calculated TSPs.

12. The system of claim 8, wherein calculating the TSP comprises:
identifying one or more active nodes within the plurality of blockchain nodes sorting the one or more active peer nodes by age using the join-time parameters;
calculating a relative TSP for each of the one or more active peer nodes using an actual time and the join-time parameters, wherein the relative TSPs are calculated using the formula:

$$p(n) = \frac{\text{actual time} - \text{joining time}_n}{\sum_{m=0}^{n}(\text{actual time} - \text{joining time}_m)}.$$

13. The system of claim 12, further comprising a coordination node adapted to select the signature node, from the plurality of blockchain nodes, to sign the transaction block, according to the calculated TSPs, wherein the selection comprises:
generating, by the coordination node, a random number, and
comparing the random number to the calculated relative TSPs.

14. A computer program product comprising a non-transitory computer readable storage medium having a plurality of instructions stored thereon, which, when executed by a processor, cause the processor to perform operations comprising:
recording join-time parameters for a plurality of blockchain nodes;
comparing a first join-time parameter for a first node of the plurality of blockchain nodes to the join-time parameters for a remainder of the plurality of blockchain nodes;
calculating, based on the comparison of the join-time parameters, a transaction signature probability (TSP) for one or more nodes within the plurality of blockchain nodes;
selecting according to the calculated TSPs, a signature node from among the one or more nodes to sign a transaction block, wherein the calculated TSPs reflect an increased chance for selection as the signature node, according to respective ages of the join-time parameters; and
calculating, by the selected signature node, a digital signature for the transaction block.

15. The computer program product of claim 14, wherein the join-time parameters comprise a plurality of timestamps corresponding to a time when each node within the plurality of blockchain nodes joined a blockchain system.

16. The computer program product of claim 14, wherein the join-time parameters comprise a plurality of timestamps corresponding to a most recent time when each node within the plurality of blockchain nodes joined a blockchain system.

17. The computer program product of claim 14, wherein the join-time parameters comprise a plurality of timestamps corresponding to a time when each node within the plurality of blockchain nodes initially joined a blockchain system.

18. The computer program product of claim 14, further comprising instructions, which, when executed by the processor, cause the processor to perform operations comprising:
calculating a hash from information known to each node within the plurality of blockchain nodes; and
comparing the hash to the calculated TSPs.

19. The computer program product of claim 14, wherein calculating the TSP comprises:
identifying one or more active nodes within the plurality of blockchain nodes sorting the one or more active peer nodes by age using the join-time parameters;

calculating a relative TSP for each of the one or more active peer nodes using an actual time and the join-time parameters, wherein the relative TSPs are calculated using the formula:

$$p(n) = \frac{\text{actual time} - \text{joining time}_n}{\sum_{m=0}^{n}(\text{actual time} - \text{joining time}_m)}.$$

20. The computer program product of claim 19, further comprising instructions, which, when executed by the processor, cause the processor to perform operations comprising:

generating, by a coordination node, a random number, and comparing the random number to the calculated relative TSPs.

* * * * *